United States Patent
Sakhnini et al.

(10) Patent No.: US 12,369,118 B2
(45) Date of Patent: Jul. 22, 2025

(54) MODIFICATION OF JOINT DISCONTINUOUS RECEPTION CYCLE

(71) Applicant: QUALCOMM Incorporated, San Diego, CA (US)

(72) Inventors: Iyab Issam Sakhnini, San Diego, CA (US); Linhai He, San Diego, CA (US); Wooseok Nam, San Diego, CA (US); Wanshi Chen, San Diego, CA (US); Peter Gaal, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 17/819,294

(22) Filed: Aug. 11, 2022

(65) Prior Publication Data
US 2024/0056971 A1   Feb. 15, 2024

(51) Int. Cl.
*H04W 52/02*   (2009.01)
*H04W 76/28*   (2018.01)

(52) U.S. Cl.
CPC ....... *H04W 52/0225* (2013.01); *H04W 76/28* (2018.02)

(58) Field of Classification Search
CPC ............. H04W 52/02; H04W 52/0216; H04W 52/0225; H04W 52/0229; H04W 52/028; H04W 76/28
See application file for complete search history.

(56) References Cited

U.S. PATENT DOCUMENTS

| 12,069,571 | B2* | 8/2024 | Sun | H04W 24/10 |
|---|---|---|---|---|
| 2022/0053593 | A1 | 2/2022 | Wang et al. | |
| 2022/0232477 | A1* | 7/2022 | Kim | H04W 52/0229 |
| 2022/0232536 | A1 | 7/2022 | Lin et al. | |
| 2022/0264462 | A1* | 8/2022 | Bao | H04W 52/0274 |
| 2022/0264696 | A1* | 8/2022 | Bao | H04W 76/28 |
| 2022/0295401 | A1* | 9/2022 | Lin | H04L 5/0053 |
| 2022/0304046 | A1* | 9/2022 | Lin | H04W 72/23 |
| 2023/0007724 | A1* | 1/2023 | Li | H04W 76/28 |
| 2023/0217538 | A1* | 7/2023 | Turtinen | H04W 76/28 370/329 |
| 2024/0022387 | A1* | 1/2024 | Li | H04W 76/28 |

OTHER PUBLICATIONS

Kim et al., UE Power Saving Techniques for Extended Reality (XR) Services in 5G NR Systems, IEEE, 7 pages, 2021.*
Paris et al., Adaptive Discontinuous Reception in 5G Advanced for Extended Reality Applications, IEEE, 6 pages, 2022.*
International Search Report and Written Opinion—PCT/US2023/070078—ISA/EPO—Nov. 7, 2023.

(Continued)

*Primary Examiner* — Frank Duong
(74) *Attorney, Agent, or Firm* — Harrity & Harrity LLP/QUALCOMM Incorporated

(57) ABSTRACT

Various aspects of the present disclosure generally relate to wireless communication. In some aspects, a user equipment (UE) may receive a configuration indicating a rule for modifying a joint discontinuous reception (DRX) cycle of two or more DRX cycles. The UE may wake up based at least in part on the rule. Numerous other aspects are described.

45 Claims, 23 Drawing Sheets

(56) References Cited

OTHER PUBLICATIONS

Moderator (NTT Docomo, Inc.): "Summary on Rel-17 TEIs", R1-2112148, 3rd Generation Partnership Project, Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 20, 2021, 73 Pages, XP052097745, p. 73, Joint configuration with SCell dormancy.
Nokia (Email Discussion Moderator): "New SID "Study on XR Enhancements for NR"", 3GPP TSG RAN Meeting #94e, RP-213587, Electronic Meeting, Dec. 6-17, 2021, 5 Pages.

\* cited by examiner

MODIFICATION OF JOINT DISCONTINUOUS RECEPTION CYCLE

FIELD OF THE DISCLOSURE

Aspects of the present disclosure generally relate to wireless communication and to techniques and apparatuses for using discontinuous reception cycles.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a configuration to indicate a rule to modify a joint discontinuous reception (DRX) cycle of two or more DRX cycles. The method may include waking up based at least in part on the rule.

Some aspects described herein relate to a method of wireless communication performed by a network entity. The method may include generating a configuration to indicate a rule to modify a joint DRX cycle of two or more DRX cycles. The method may include transmitting the configuration.

Some aspects described herein relate to a method of wireless communication performed by a UE. The method may include receiving an indication of a modification of a joint DRX cycle of two or more DRX cycles. The method may include waking up based at least in part on the modification.

Some aspects described herein relate to a method of wireless communication performed by a network entity. The method may include generating an indication of a modification of a joint DRX cycle of two or more DRX cycles. The method may include transmitting the indication.

Some aspects described herein relate to a UE for wireless communication. The UE may include a memory and one or more processors coupled to the memory. The one or more processors may be configured to receive a configuration to indicate a rule to modify a joint DRX cycle of two or more DRX cycles. The one or more processors may be configured to wake up based at least in part on the rule.

Some aspects described herein relate to a network entity for wireless communication. The network entity may include a memory and one or more processors coupled to the memory. The one or more processors may be configured to generate a configuration to indicate a rule to modify a joint DRX cycle of two or more DRX cycles. The one or more processors may be configured to transmit the configuration.

Some aspects described herein relate to a UE for wireless communication. The may include a memory and one or more processors coupled to the memory. The one or more processors may be configured to receive an indication of a modification of a joint DRX cycle of two or more DRX cycles. The one or more processors may be configured to wake up based at least in part on the modification.

Some aspects described herein relate to a network entity for wireless communication. The network entity may include a memory and one or more processors coupled to the memory. The one or more processors may be configured to generate an indication of a modification of a joint DRX cycle of two or more DRX cycles. The one or more processors may be configured to transmit the indication.

Some aspects described herein relate to a non-transitory computer-readable medium that stores a set of instructions for wireless communication by a UE. The set of instructions, when executed by one or more processors of the UE, may cause the UE to receive a configuration to indicate a rule to modify a joint DRX cycle of two or more DRX cycles. The set of instructions, when executed by one or more processors of the UE, may cause the UE to wake up based at least in part on the rule.

Some aspects described herein relate to a non-transitory computer-readable medium that stores a set of instructions for wireless communication by a network entity. The set of instructions, when executed by one or more processors of the network entity, may cause the network entity to generate a configuration to indicate a rule to modify a joint DRX cycle of two or more DRX cycles. The set of instructions, when executed by one or more processors of the network entity, may cause the network entity to transmit the configuration.

Some aspects described herein relate to a non-transitory computer-readable medium that stores a set of instructions for wireless communication by an UE. The set of instructions, when executed by one or more processors of the UE, may cause the UE to receive an indication of a modification of a joint DRX cycle of two or more DRX cycles. The set of instructions, when executed by one or more processors of the UE, may cause the UE to wake up based at least in part on the modification.

Some aspects described herein relate to a non-transitory computer-readable medium that stores a set of instructions for wireless communication by a network entity. The set of instructions, when executed by one or more processors of the network entity, may cause the network entity to generate an indication of a modification of a joint DRX cycle of two or more DRX cycles. The set of instructions, when executed by one or more processors of the network entity, may cause the network entity to transmit the indication.

Some aspects described herein relate to an apparatus for wireless communication. The apparatus may include means for receiving a configuration to indicate a rule to modify a joint DRX cycle of two or more DRX cycles. The apparatus may include means for waking up based at least in part on the rule.

Some aspects described herein relate to an apparatus for wireless communication. The apparatus may include means for generating a configuration to indicate a rule to modify a joint DRX cycle of two or more DRX cycles. The apparatus may include means for transmitting the configuration.

Some aspects described herein relate to an apparatus for wireless communication. The apparatus may include means for receiving an indication of a modification of a joint DRX cycle of two or more DRX cycles. The apparatus may include means for waking up based at least in part on the modification.

Some aspects described herein relate to an apparatus for wireless communication. The apparatus may include means for generating an indication of a modification of a joint DRX cycle of two or more DRX cycles. The apparatus may include means for transmitting the indication.

Aspects generally include a method, apparatus, system, computer program product, non-transitory computer-readable medium, UE, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
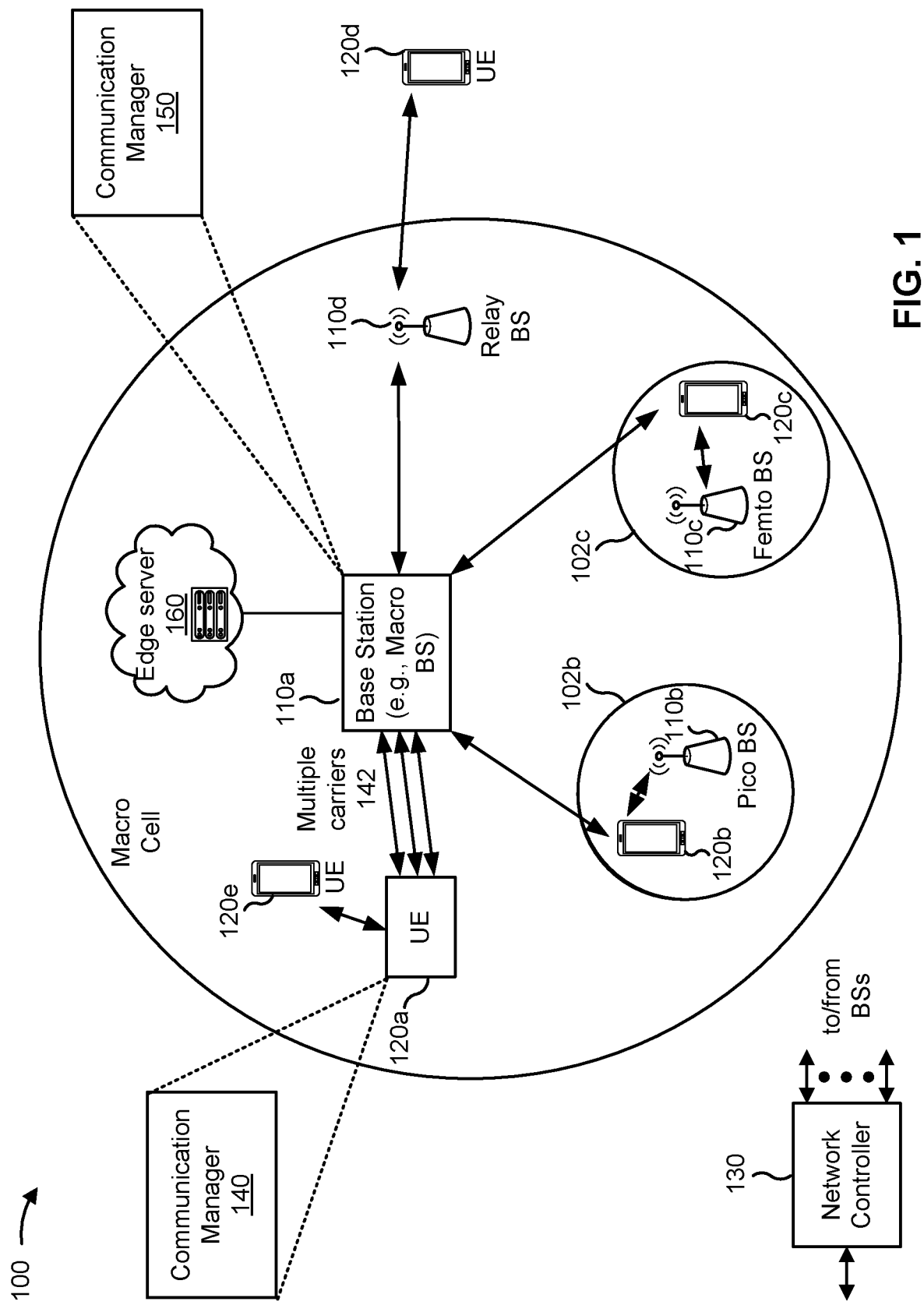
FIG. 1 is a diagram illustrating an example of a wireless network, in accordance with the present disclosure.

Some user equipments (UEs), including devices for extended reality (XR), may require low-latency traffic to and from an edge server or a cloud environment. An XR device may be an augmented reality (AR) glass device, a virtual reality (VR) glass device, a gaming device, an educational device, an industrial device, or other devices that provide for AR and/or VR. In one or more examples, a UE, such as an XR device may operate on battery power. The consumption of battery power may be reduced by limiting an amount of time that processing resources of the UE are active for computations and power consumption.

According to one or more examples, a UE, such as the XR device, may conserve power using a discontinuous reception (DRX) mode. A UE in a DRX mode may transition between a sleep state for power conservation and an active state for data transmission and reception. In one or more examples, a UE in a sleep state may turn off a radio and one or more other components or functions of the UE. Turning off or switching off a radio may include removing power from the radio such that the radio is not fully operating or not operating with full power. In one or more examples, a UE may wake up to an active state by turning on a radio and one or more other components or functions of the UE. Other components may include, for example, buffers, timers, memories, and/or processors. Functions of the UE may include, for example, communications, application operations, and/or configurations. Turning on or switching on a radio may include providing power to the radio such that the radio is fully operating (e.g., all applications or functions may sufficient power to execute) and/or operating with full power. As used herein, the active state for data transmission and reception may be referred to as a DRX "ON-duration" (or "on-duration").

Traffic (e.g., XR traffic) may have multiple flows of data. An XR flow may include some control information. In an example, such traffic may involve data bursts that are periodic with some time jitter in the arrival. Jitter time may include variations in time of arrival caused by the environment, changes in propagation time, or variations in time introduced by radio components or processors. Furthermore, the packet sizes and the number of packets for a burst may be vary from one burst to the next. Additionally, multiple traffic flows can be used for downlink having different periodicities. As such, configuring multiple DRX cycles with different periodicities for multiple flows may cause the UE to be sleeping for less time, which consumes power. Being in an active state consumes power.

A UE may be configured with multiple DRX configurations. For example, a first DRX cycle and a second DRX cycle, each with a DRX configuration, may be combined to form a joint DRX cycle. The joint DRX cycle may be a combination of DRX cycles, and the terms "joint DRX cycle" and "combination of DRX cycles" may be used interchangeably. The joint DRX cycle may include two or more DRX cycles that a UE uses simultaneously or concurrently (occurring at the same time or at least partially overlapping in time). More specifically, on-durations of the first DRX cycle and on-durations of the second DRX cycle may be combined to form on-durations of the joint DRX cycle. The UE is awake for the on-durations of the joint DRX cycle. However, if the UE is to be awake for on-durations of both DRX cycles, the UE may have less sleep time. Thus, causing the UE to consume more power.

According to various aspects described herein, a UE may modify the joint DRX cycle. The UE may modify the joint DRX cycle using a configured rule. Alternatively, or additionally, the UE may modify the joint DRX cycle in response to an indication from a network entity. The modification may include skipping one or more on-durations of the first DRX cycle and/or the second DRX cycle. The modification may include extending one or more on-durations of the first DRX cycle and/or the second DRX cycle. The modification may include adding one or more on-durations of the first DRX cycle and/or the second DRX cycle. The modification may include modifying a DRX parameter for a DRX cycle, either the first DRX cycle or the second DRX cycle. As a result, the UE may be awake for less time. Power and processing resources may be conserved while not degrading communications. In some cases, signaling resources may also be conserved.

For example, a rule may specify that an on-duration of a first DRX cycle is to be skipped based at least in part on a condition or event. The condition or event may be, for example, that the on-duration of the first DRX cycle of the joint DRX cycle is too close in time to an on-duration of a second DRX cycle of the joint DRX cycle. The UE may remain asleep during an occasion of the on-duration of the first DRX cycle.

In another example, a rule may specify that an on-duration of the second DRX cycle is to be extended based at least in part on a condition or event. The condition or event may be, for example, that the amount of data to be transmitted is greater than what an existing length of on-duration can provide. If the on-duration of the second DRX is extended, the UE may remain awake for an extended period of time. In some examples, this extension may be a result of a recent skipped on-duration.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include a UE 120 or multiple UEs 120 (shown as a UE 120a, a UE 120b, a UE 120c, a UE 120d, and a UE 120e). The wireless network 100 may also include one or more network entities, such as base stations 110 (shown as a BS 110a, a BS 110b, a BS 110c, and a BS 110d), and/or other network entities. A base station 110 is a network entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network entities in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. A network entity may be configured to utilize a protocol stack that is physically or logically distributed among two or more nodes (such as one or more CUs, one or more DUs, or one or more RUs). In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is a network entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network with network entities that include different types of BSs, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of network entities and may provide coordination and control for these network entities. The network controller 130 may communicate with the base stations 110 via a backhaul communication link. The network entities may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive a configuration to indicate a rule to modify a joint DRX cycle of two or more DRX cycles. The communication manager 140 may wake up based at least in part on the rule.

In some aspects, the communication manager 140 may receive an indication of a modification of a joint DRX cycle of two or more DRX cycles. The communication manager 140 may wake up based at least in part on the modification. Additionally, or alternatively, the communication manager 140 may perform one or more other operations described herein. Example 100 shows multiple carriers 142 for communication between the UE 120 (e.g., UE 120a) and the network entity (e.g., base station 110a).

In some aspects, a network entity (e.g., base station 110) may include a communication manager 150. As described in more detail elsewhere herein, the communication manager 150 may generate a configuration to indicate a rule to modify a joint DRX cycle of two or more DRX cycles. The communication manager 150 may transmit the configuration.

In some aspects, the communication manager 150 may generate an indication of a modification of a joint DRX cycle of two or more DRX cycles. The communication manager 150 may transmit the indication. Additionally, or alternatively, the communication manager 150 may perform one or more other operations described herein.

In some aspects, an edge server 160 may be connected to a network entity (e.g., base station 110) to provide network functionality and processing assistance closer to an edge of a network. For example, the edge server 160 may perform some processing for an application. The edge server 160 may be part of a cloud environment.

As indicated above, FIG. 1 is provided as an example. Other examples may differ from what is described with regard to FIG. 1.

Figure 2:
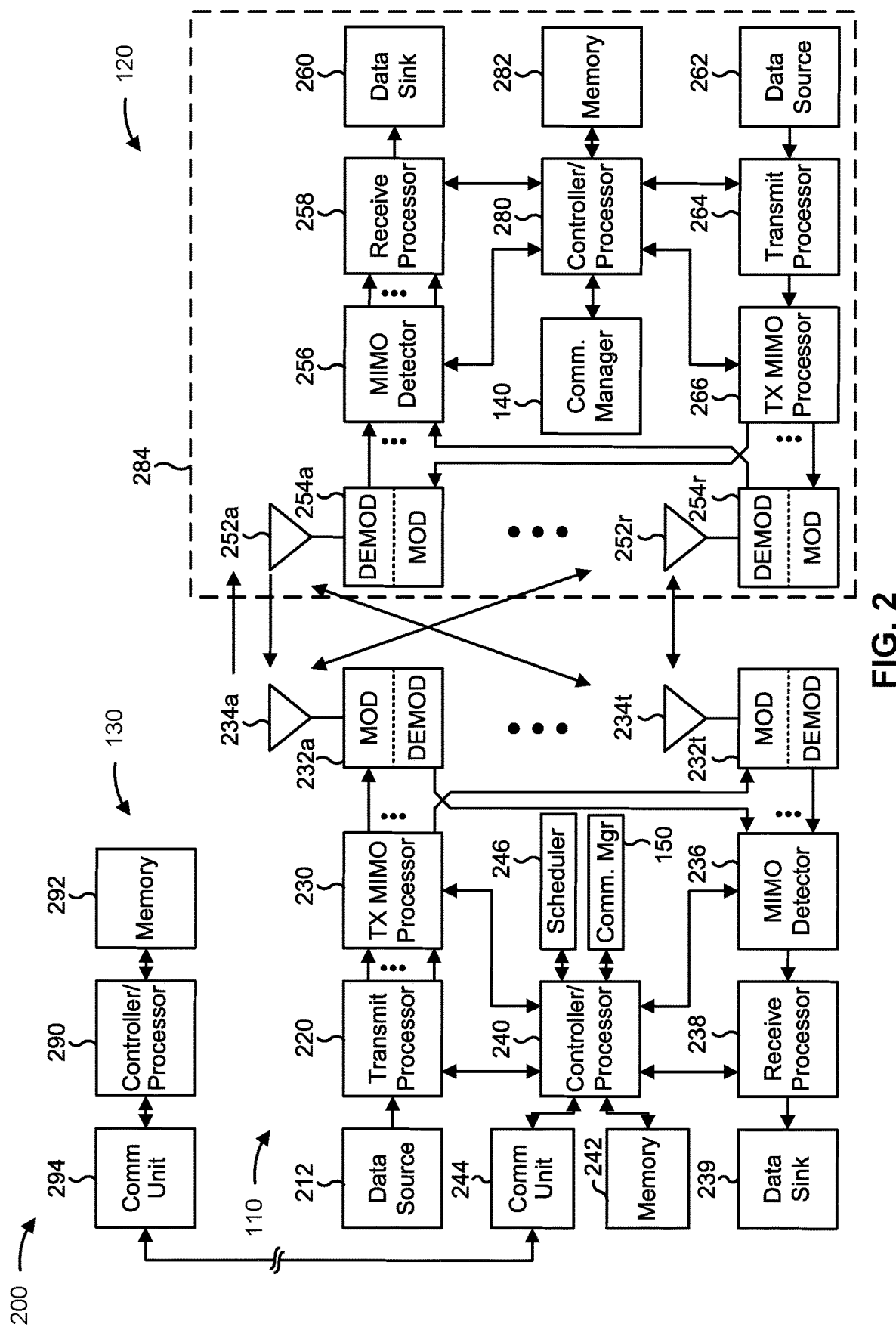
FIG. 2 is a diagram illustrating an example of a network entity (e.g., base station) in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-23).

At the network entity (e.g., base station 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna (s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-23).

A controller/processor of a network entity (e.g., the controller/processor 240 of the base station 110), the controller/processor 280 of the UE 120, and/or any other component(s) of FIG. 2 may perform one or more techniques associated with modifying a joint DRX cycle, as described in more detail elsewhere herein. For example, the controller/processor 240 of the base station 110, the controller/processor 280 of the UE 120, and/or any other component(s) of FIG. 2 may perform or direct operations of, for example, process 1400 of FIG. 14, process 1500 of FIG. 15, process 1600 of FIG. 16, process 1700 of FIG. 17, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 1400 of FIG. 14, process 1500 of FIG. 15, process 1600 of FIG. 16, process 1700 of FIG. 17, and/or other processes as described herein. In some examples, executing instructions may include running the instructions, converting the instructions, compiling the instructions, and/or interpreting the instructions, among other examples.

In some aspects, the UE 120 includes means for receiving a configuration to indicate a rule to modify a joint DRX cycle of two or more DRX cycles; and/or means for waking up based at least in part on the rule. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., base station 110) includes means for generating a configuration to indicate a rule to modify a joint DRX cycle of two or more DRX cycles; and/or means for transmitting the configuration. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE 120 includes means for receiving an indication of a modification of a joint DRX cycle of two or more DRX cycles; and/or means for waking up based at least in part on the modification.

In some aspects, the network entity includes means for generating an indication of a modification of a joint DRX cycle of two or more DRX cycles; and/or means for transmitting the indication.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
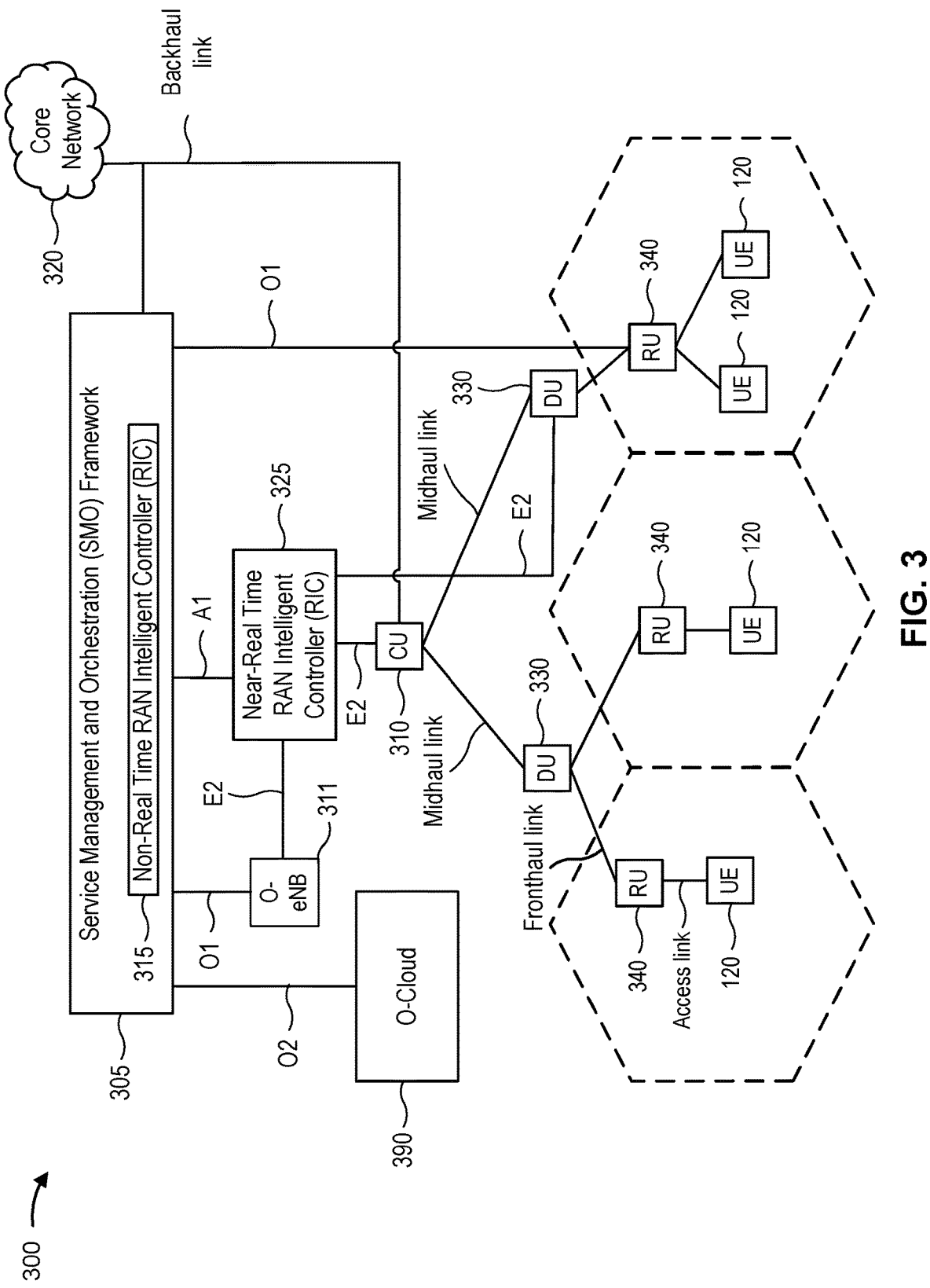
FIG. 3 is a diagram illustrating an example of a disaggregated base station, in accordance with the present disclosure.

FIG. 3 is a diagram illustrating an example of a disaggregated base station 300, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)).

Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-RT MC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The fronthaul link, the midhaul link, and the backhaul link may be generally referred to as "communication links." The RUs 340 may communicate with respective UEs 120 via one or more RF access links. In some aspects, the UE 120 may be simultaneously served by multiple RUs 340. The DUs 330 and the RUs 340 may also be referred to as "O-RAN DUs (O-DUs") and "O-RAN RUs (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units (e.g., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
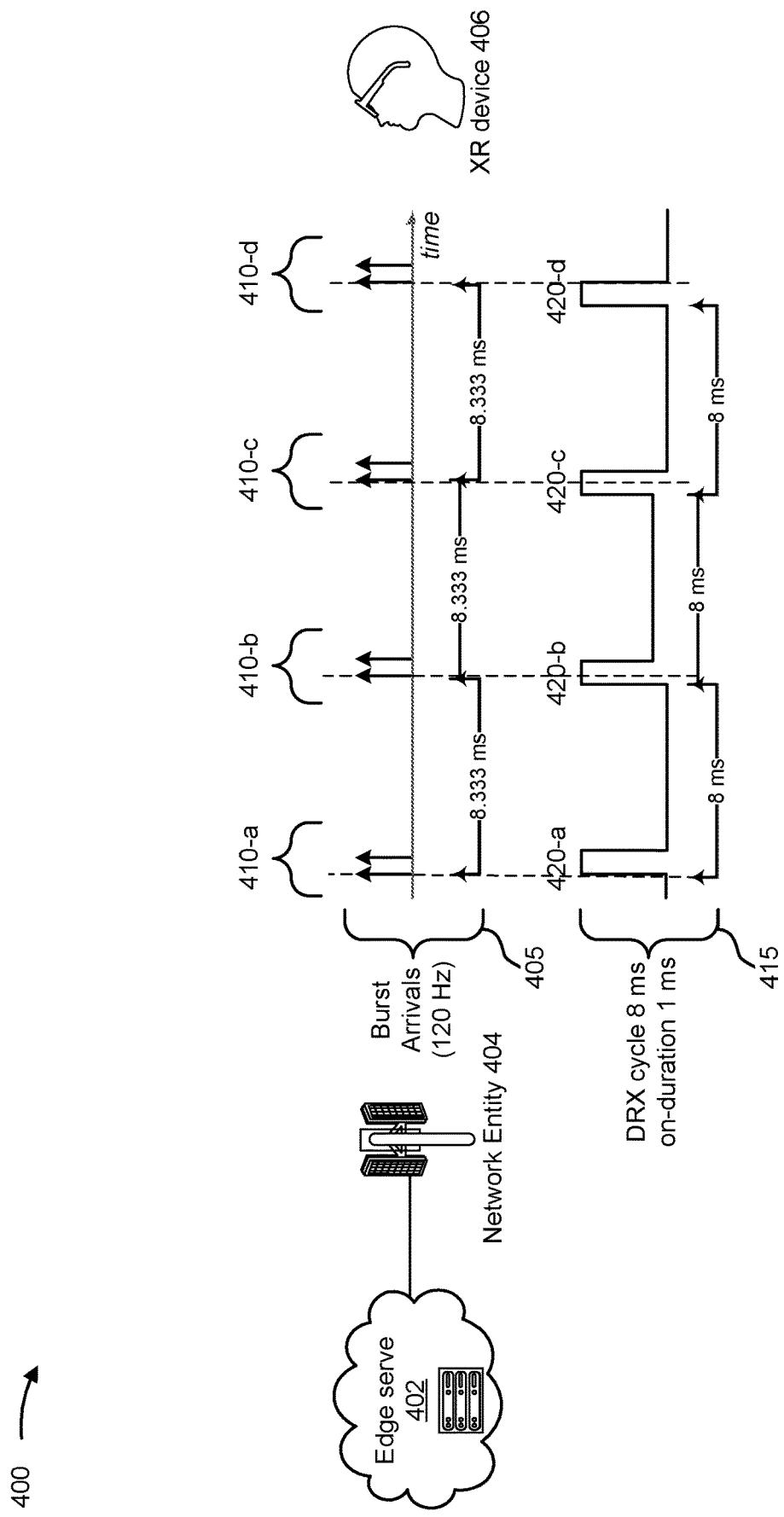
FIG. 4 is a diagram illustrating an example of a discontinuous reception (DRX) cycle, in accordance with the present disclosure.

FIG. 4 is a diagram illustrating an example 400 of a DRX cycle, in accordance with the present disclosure. Example 400 shows the DRX cycle in relation to XR traffic bursts between an edge server 402 (via a network entity 404) to a UE, such as an XR device 406.

In one or more examples, an XR device 406 (e.g., UE 120), may communicate with an edge server 402 (e.g., edge server 160) or a cloud environment, via a network entity 404 (e.g., base station 110). By offloading some computations to the edge server 402, the XR device 406 may save processing resources. In one scenario, the XR device 406 may split computations for an application with the edge server 402 on the other side of the network entity 404. The edge server 402 may render video frames, such as intra-coded (I) frames and predicted (P) frames, encode the video frames, align the video frames with user pose information, and perform other related computations. However, this means there may be more traffic between the XR device 406 and the edge server 402, which will cause the XR device 406 to consume more power and signaling resources. XR downlink traffic (e.g., video frames) may have a periodic pattern that corresponds to a frame rate of transmitted video data (e.g., H.264/H.265 encoded video).

The XR device 406 may have limited battery capacity while being expected to have a battery life of a smartphone (e.g., full day of use). Battery power is an issue even when the XR device 406 is tethered to a smartphone and uses the same smartphone battery. XR device power dissipation may be limited and may lead to an uncomfortable user experience and/or a short battery life. Power dissipation may be reduced by limiting an amount of time that processing resources of the XR device 406 are active for computations and power consumption. Accordingly, some wireless communication systems may support a DRX mode for the XR device 406 or other UEs.

A UE, such as the XR device 406, in a DRX mode may transition between a sleep state for power conservation and an active state for data transmission and reception. A UE that uses different DRX cycles (different periods) may have non-uniform cycle durations within a DRX time period. Such non-uniform cycle durations may provide DRX on-durations that are aligned with a periodicity of downlink traffic to the UE. For low-latency applications, the DRX cycle and a start offset of a DRX cycle are to be time-aligned to downlink traffic arrivals.

For example, a UE, such as the XR device 406, may serve the user and enter a brief sleep state in a DRX cycle and between video frames. The XR device 406 and the edge server 402 may attempt to align the uplink and downlink DRX cycles as part of connected DRX (C-DRX), which is DRX operation while the XR device 406 is in an RRC connected state. However, there are DRX-multimedia timing mismatches that prevent such alignment and that prevent successful use of C-DRX.

Example 400 shows, on the top timeline, downlink traffic burst arrivals 405 of XR traffic that may include a number of downlink traffic bursts 410 that are transmitted according to a periodic pattern. Example 400 also shows a DRX configuration 415 on the bottom timeline for a DRX cycle with periodic on-durations at on-duration occasions 420. The downlink traffic bursts 410 may include, for example, XR downlink traffic with a periodic pattern that corresponds to a frame rate of transmitted data (e.g., H.264/H.265 encoded video). An update rate of the XR traffic may be, for example, 120 Hertz (Hz) or 60 Hz, thus resulting in a downlink traffic burst arrival periodicity of 8.333 ms or 16.667 ms, respectively. The DRX configuration 415 may have on-durations occasions 415-a to 415-d that respectively correspond to downlink traffic bursts 410-a to 410-d.

DRX configurations may have one millisecond as the finest granularity for a DRX cycle, and the start of the on-duration may be aligned to millisecond time boundaries (shown by arrows below the bottom timeline). That is, each on-duration occasion 420 of the DRX cycle is aligned with a millisecond integer value and not a portion of a millisecond. This may result in a partial millisecond difference between a start of a DRX on-duration and a start of a downlink traffic burst of XR traffic. The start of each downlink traffic burst 410 is shown by a dashed line. There may be multiple partial millisecond differences between the start of a downlink traffic burst and a start of a DRX-on duration. For example, the dashed line for the start of downlink traffic burst 410-b does not align with the start of the on-duration occasion 420-b. These partial millisecond differences may compound with each on-duration of a DRX cycle to misalign the DRX cycle and the XR traffic periodicity. For example, the start of the downlink traffic bursts (dashed lines) may drift (increase in the difference) to a middle of an DRX on-duration occasion, as shown by the dashed line for traffic burst 410-c going through the middle of on-duration occasion 420-c. This causes an increase in latency and power consumption.

As indicated above, FIG. 4 is provided as an example. Other examples may differ from what is described with respect to FIG. 4.

Figure 5:
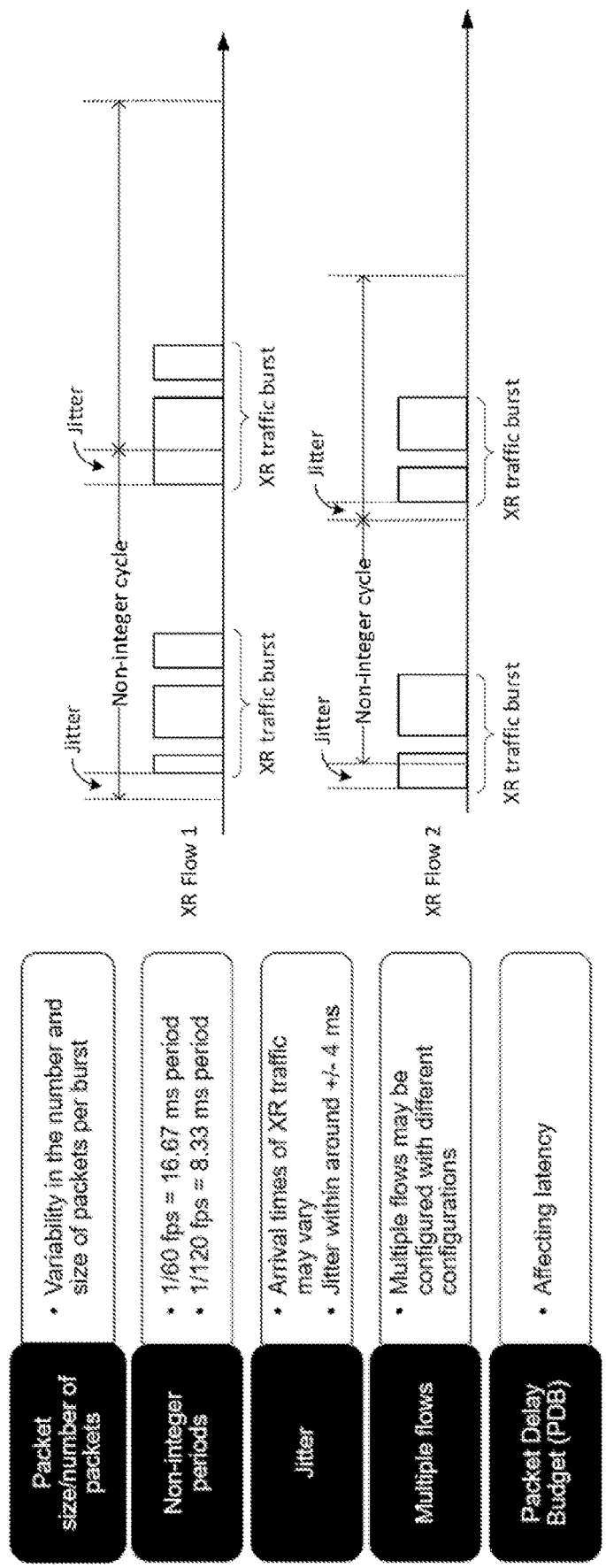
FIG. 5 is a diagram illustrating an example of multiple extended reality traffic flows, in accordance with the present disclosure.

FIG. 5 is a diagram illustrating an example 500 of multiple XR traffic flows, in accordance with the present disclosure.

In one or more examples, XR traffic may include multiple XR flows for different types of traffic, such as a first XR flow (XR Flow 1) for video and a second XR flow (XR Flow 2) for audio. Example 500 shows XR Flow 1 and XR Flow 2 may have XR downlink traffic bursts that are periodic with some time jitter in the arrival. The packet sizes and the number of packets for a certain burst may be variable. Multiple traffic flows can be used for downlink with different periodicities. For example, XR Flow 1 can have a different periodicity than XR Flow 2. However, configuring multiple C-DRX cycles for the different periodicities of multiple XR flows requires the UE to be sleeping for less time, which consumes power.

As indicated above, FIG. 5 is provided as an example. Other examples may differ from what is described with regard to FIG. 5.

Figure 6:
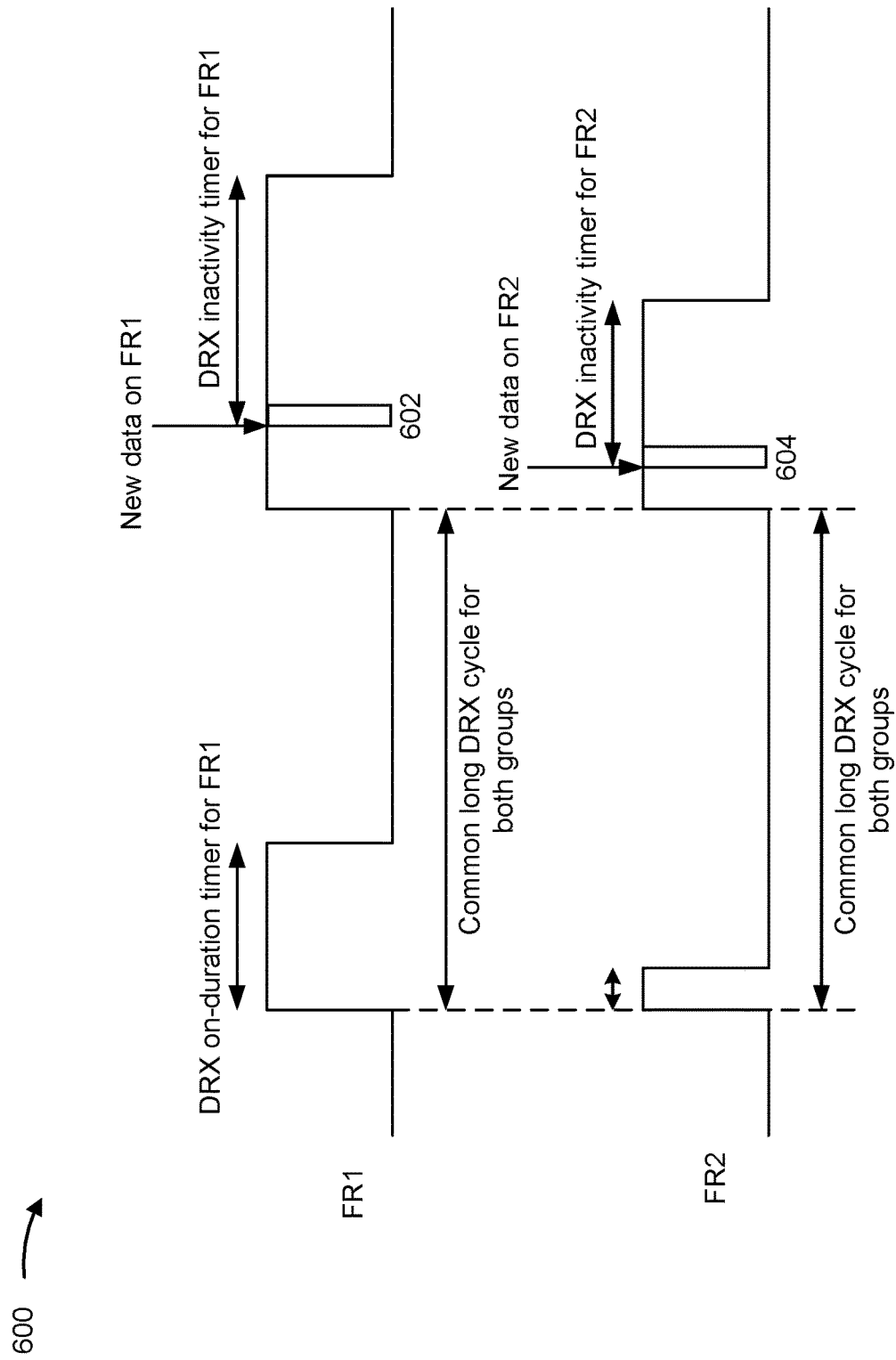
FIG. 6 is a diagram illustrating an example of DRX groups, in accordance with the present disclosure.

FIG. 6 is a diagram illustrating an example 600 of DRX groups, in accordance with the present disclosure.

In one or more examples, if there are multiple downlink traffic flows, the multiple downlink traffic flows may be carried on multiple carriers and/or using multiple DRX cycles. Each DRX cycle may correspond to a DRX on-duration timer (length of an on-duration) and a DRX inactivity timer (how long after new data 602 and 604 is received before the UE sleeps). A network may configure different DRX timers for different carriers, including FR1 and FR2 carriers. The DRX timers may correspond to DRX groups, where a DRX group includes a DRX cycle that uses a DRX timer. To allow power extensive FR2 carriers to enter DRX inactive time sooner, a UE may enable separate DRX on-duration timers and DRX inactivity timers for FR1 and FR2. A DRX inactivity timer for a DRX group may be started or restarted by new data in the DRX group. DRX groups may have a common long DRX cycle. Many procedures may be defined based on the DRX cycle. It may be more power efficient for FR1 and FR2 carriers to wake up at the same time.

As indicated above, FIG. 6 is provided as an example. Other examples may differ from what is described with regard to FIG. 6.

Figure 7:
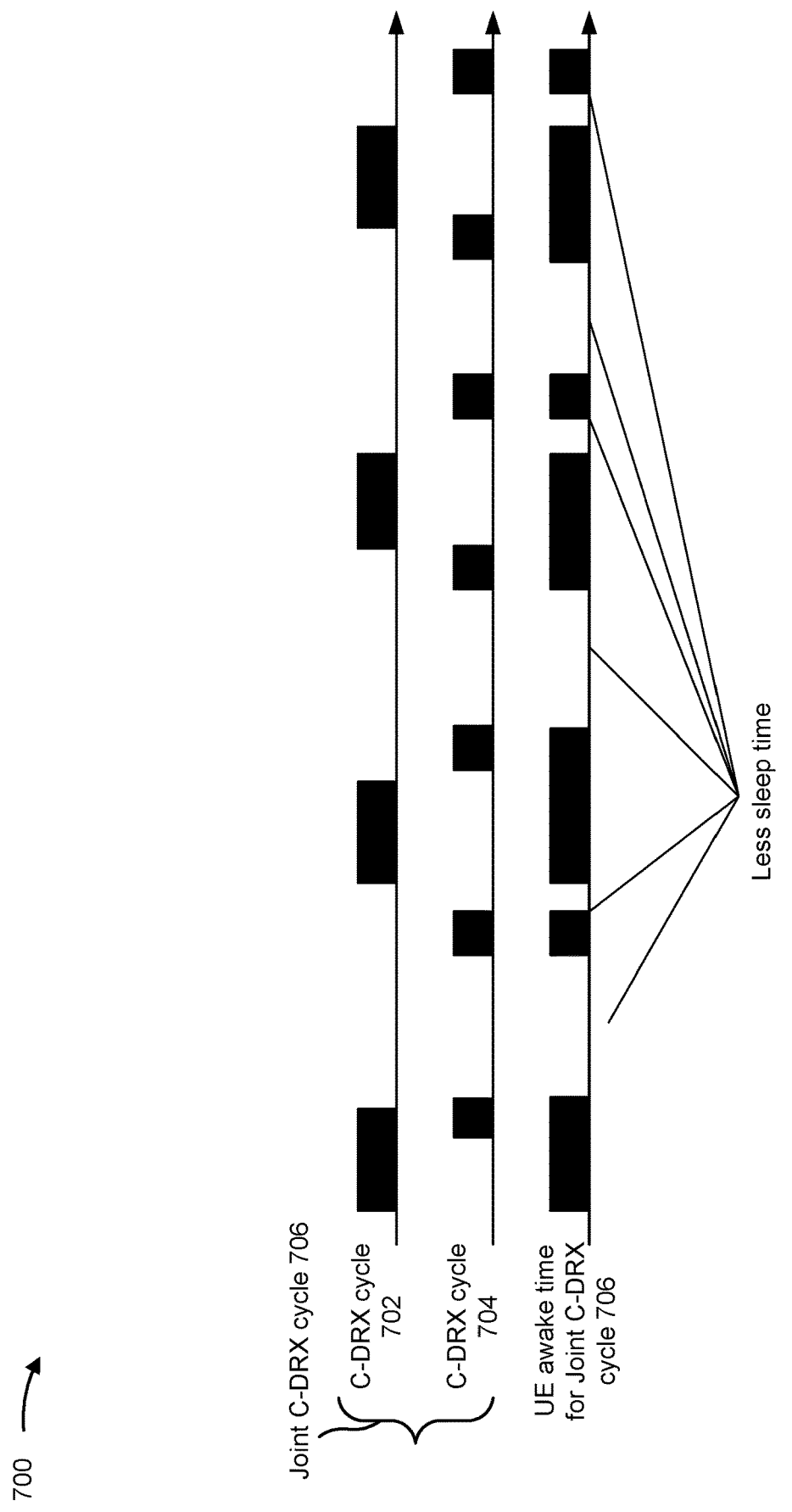
FIG. 7 is a diagram illustrating an example of wake up time for multiple DRX cycles, in accordance with the present disclosure.

FIG. 7 is a diagram illustrating an example 700 of wake up time for multiple DRX cycles, in accordance with the present disclosure.

A UE may be awake for on-durations for a C-DRX cycle corresponding to XR traffic bursts. The XR traffic bursts may have time jitter in the arrival and a different update rates that do not match with a single C-DRX cycle. This can be solved with non-uniform C-DRX cycles (also referred to as "eC-DRX cycles") to match the non-uniform XR traffic bursts. The non-uniform C-DRX cycles may be changed dynamically with downlink control information (DCI) or a wake up signal (WUS). The WUS may be a signal (e.g., a sequence of bits) configured to wake up the UE. The DCI or WUS may include C-DRX parameters (e.g., on-duration start, inactivity timer).

Due to the non-uniform C-DRX cycles, periodic messages (e.g., search space sets, channel state information reference signals (CSI-RSs)) may fall outside the active time of a single C-DRX cycle and add latency. Some solutions to address this may involve using multiple C-DRX configurations with different periods for the multiple XR data flows. The XR data flows may have bursts of various lengths.

Accordingly, a UE may be configured with multiple C-DRX configurations. A C-DRX configuration that uses a WUS may be a WUS configuration. Example 700 shows C-DRX cycle 702 and C-DRX cycle 704 that form joint C-DRX cycle 706. That is, on-durations of C-DRX cycle 702 and one-durations of C-DRX cycle 704 combine to form on-durations of the joint C-DRX cycle 706. Example 700 shows when the UE is awake for the joint C-DRX cycle 706. If the UE is to be awake for both C-DRX 702 on-durations and C-DRX 704 on-durations as part of the joint C-DRX cycle 706, the UE may have less sleep time. Example 700 shows less sleep time for the joint C-DRX 706 cycle than for an individual C-DRX cycle. This may cause the UE to consume more power.

As indicated above, FIG. 7 is provided as an example. Other examples may differ from what is described with regard to FIG. 7.

Figure 8:
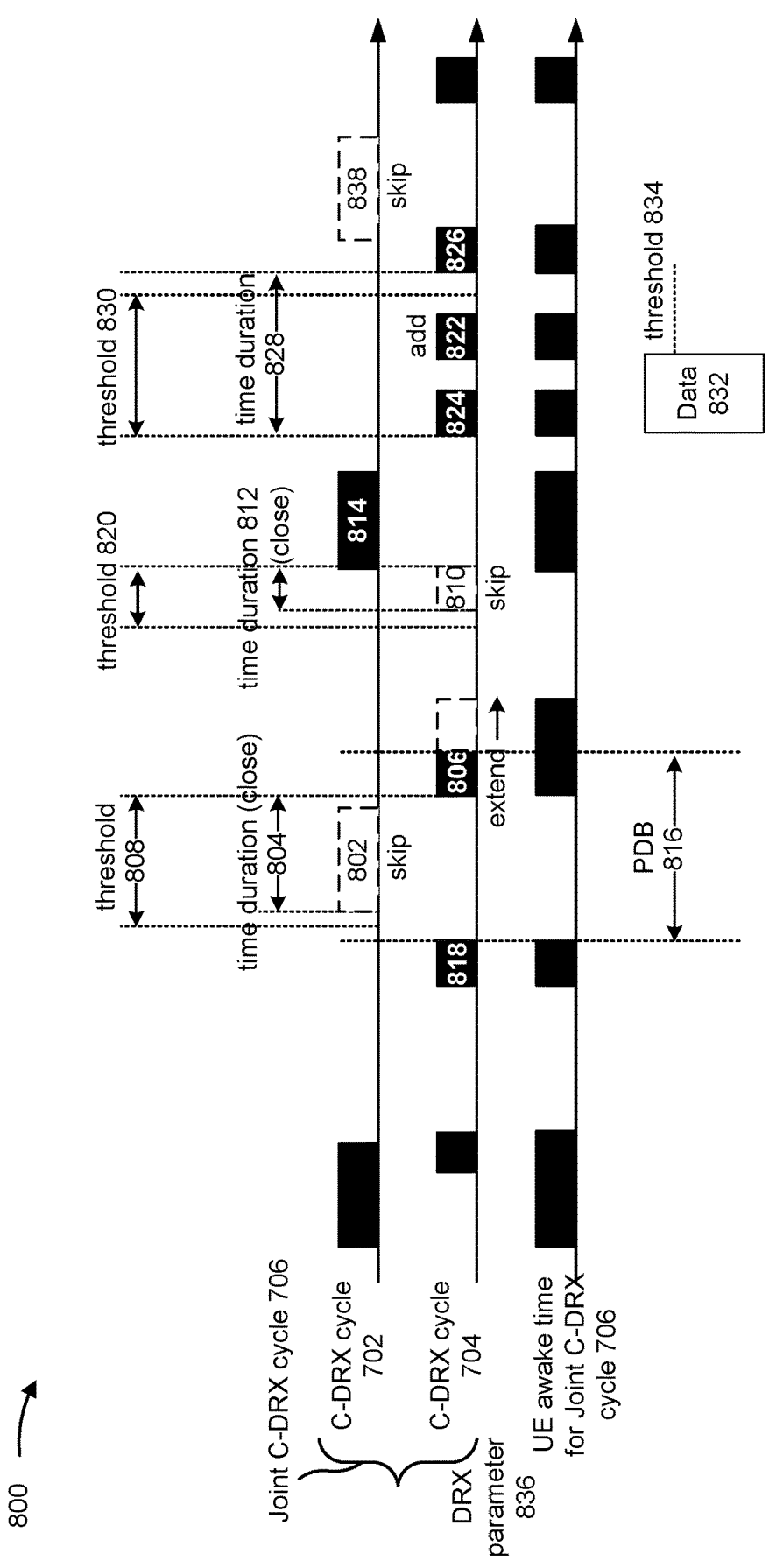
FIG. 8 is a diagram illustrating an example of modifying a joint DRX cycle, in accordance with the present disclosure.

FIG. 8 is a diagram illustrating an example 800 of modifying a joint DRX cycle, in accordance with the present disclosure.

According to various aspects described herein, a UE (e.g., UE 102) may modify the joint C-DRX cycle 706. The UE may modify the joint C-DRX cycle 706 using a configured rule or in response to receiving an indication. The modification may include skipping, extending, or adding one or more on-durations of C-DRX cycle 702 and/or C-DRX cycle 704. The modification may include modifying one or more DRX parameters (e.g., on-duration start, inactivity timer) for one or more DRX cycles of the joint C-DRX cycle 706. As a result, the UE may be awake for less time and conserve power. Modifications of the joint C-DRX cycle 706 may be applicable with the same component carrier (CC) or across CCs. Modifications of the joint C-DRX cycle 706 may be applicable with the same C-DRX group or across C-DRX groups.

In some aspects, a network entity may transmit a configuration to indicate a rule to modify the joint C-DRX cycle 706. The rule may specify that an on-duration is skipped based at least in part on a condition or event. The condition or event may be associated with a timing of data, a timing of on-durations in relation to the data, an amount of data, a success of data, a failure of data, or other actions that may give reason for a modification of the joint C-DRX cycle 706. For example, the rule may specify that if a time duration between on-durations of two C-DRX cycles satisfies a threshold (e.g., is less than a specified time duration), the UE may skip an on-duration. Example 800 shows the UE skipping on-duration 802 because time duration 804 between on-duration 802 of C-DRX cycle 702 and on-duration 806 of C-DRX 704 satisfies (e.g., is equal to or less than) threshold 808. Threshold 808 (time-duration threshold) may be a configured time duration (e.g., ms). Rather than the UE waking for two on-durations, the UE may wake up for only one duration. Example 800 shows that on-durations from any DRX cycle of the joint C-DRX cycle 706 may be skipped. The UE may skip on-duration 810 if on-duration 810 is too close in time to an on-duration 814 on a different DRX cycle. On-duration 810 may be considered too close if a time duration 812 is less than another threshold 820.

In some aspects, the UE may be aware of a packet delay budget (PDB) 816, which is an upper bound for the time duration that a packet may be delayed between the UE and a termination point in the network, such as at a user plane function. The PDB 816 may be configured for semi-persistent or configured grant communications. The UE may skip on-duration 802 based at least in part on the PDB 816. For example, the UE may skip on-duration 802 if the PDB 816 will be exceeded for a packet if on-duration 802 is skipped. That is, the UE may not skip the on-duration 802 if the packet cannot wait until the next on-duration before timing out and requiring retransmission. The UE may not skip on-duration 802 if the PDB 816 will be exceeded for a packet if on-duration 802 is skipped.

In some aspects, the rule may specify that an on-duration is extended based at least in part on a condition or event. For example, the UE may extend on-duration 806 if on-duration 802 is canceled (e.g., due to being skipped). The UE may extend on-duration 806 to the length of on-duration 802. On-duration 806 may be the next on-duration or a closest on-duration for C-DRX cycle 704. The condition or event may be the length of on-duration 802 being greater than a last on-duration 818 of C-DRX cycle 704. The UE may extend on-duration 806 based at least in part on the PDB configured for the UE. The UE may also reduce a length of an on-duration based at least in part on a condition or an event.

In some aspects, the rule may specify adding an on-duration to a DRX cycle based at least in part on a condition or event. The condition or event may be the time duration between successive on-durations satisfying (e.g., matching, exceeding) a duration threshold (e.g., maximum time duration) and/or data satisfying (e.g., matching, exceeding) a data threshold (e.g., maximum data size). Example 800 shows on-duration 822 added to C-DRX cycle 704 between on-duration 824 and on-duration 826 if a time duration 828 between on-duration 824 and on-duration 826 exceeds time threshold 830. The condition or event may also include an amount of data 832 satisfying (e.g., matching, exceeding) data threshold 834.

In some aspects, the rule may specify modification of a DRX parameter for a DRX cycle. Example 800 shows that the UE may modify DRX parameter 836 of C-DRX cycle 704. This may include adjusting an on-duration start earlier or later. This may include adjusting an inactivity timer to be shorter or longer.

In some aspects, the UE may prioritize on-durations for a flow with a low PDB (below a PDB threshold). Example 800 shows that UE may prioritize on-durations of C-DRX cycle 704 over on-durations of C-DRX cycle 702 if the PDB of C-DRX cycle 704 has dropped below a PDB threshold. On-duration 838 of C-DRX cycle 702 is skipped, while on-duration 826 of C-DRX cycle 704 is used. This helps to avoid data falling outside of the PDB and requiring retransmission.

As indicated above, FIG. 8 is provided as an example. Other examples may differ from what is described with regard to FIG. 8.

Figure 9:
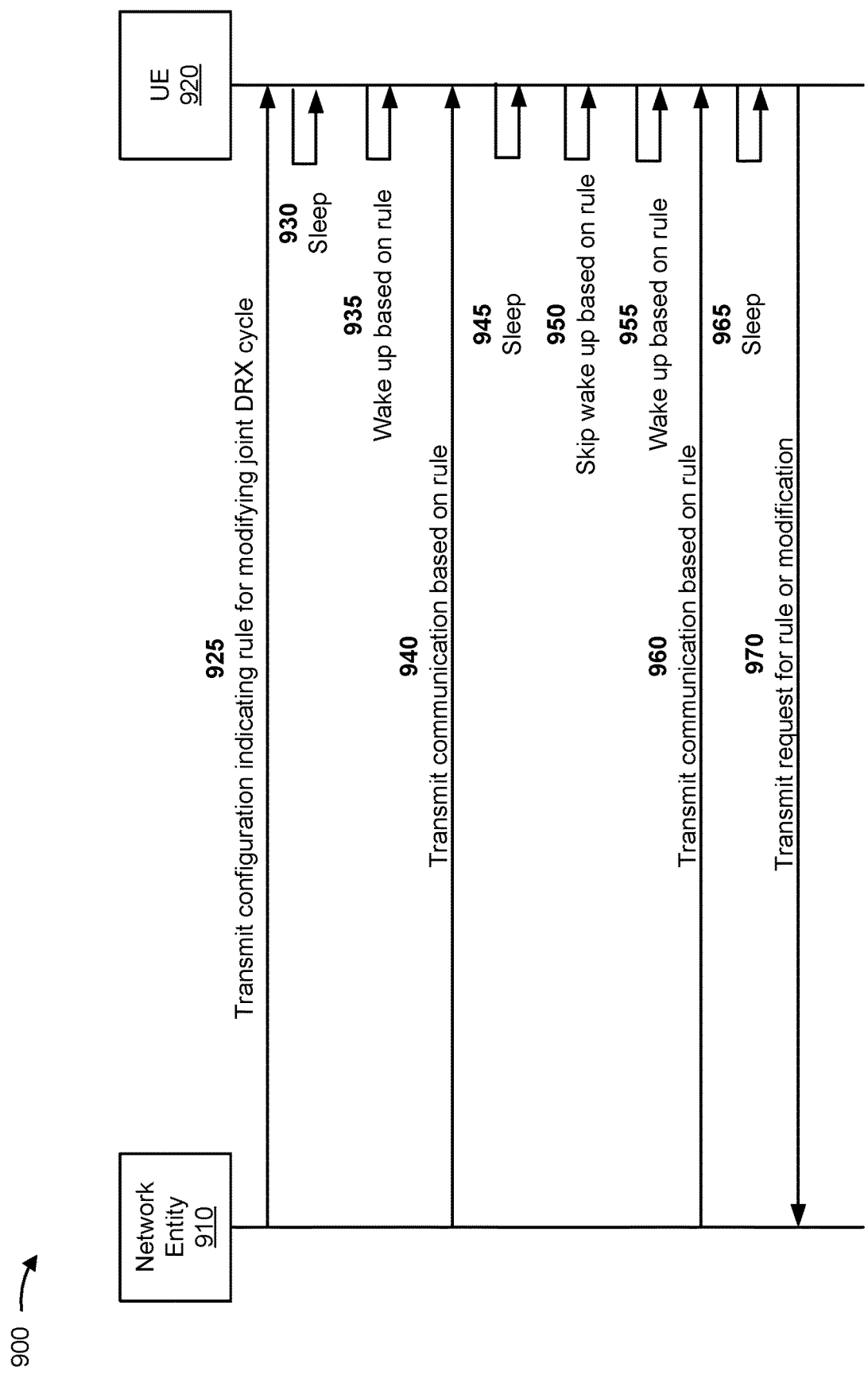
FIG. 9 is a diagram illustrating an example associated with configuring a rule for joint DRX modification, in accordance with the present disclosure.

FIG. 9 is a diagram illustrating an example 900 associated with configuring a rule for joint DRX modification, in accordance with the present disclosure. As shown in FIG. 9, a network entity 910 (e.g., base station 110) and a UE 920 (e.g., UE 120) may communicate with one another on a wireless network (e.g., wireless network 100).

As shown by reference number 925, the network entity 910 may transmit a configuration to indicate a rule to modify a joint DRX cycle. The network entity 910 may generate the configuration based at least in part on traffic conditions, channel conditions, one or more DRX configurations configured at the UE 920, and/or UE capability of the UE 920.

As shown by reference number 930, the UE 920 may sleep based at least in part on a DRX configuration configured for the UE 920. The DRX configuration may indicate a periodicity for on-durations, a start time or offset for on-durations, and/or a length of on-durations. The DRX configuration may be associated with a DRX cycle of the joint DRX cycle, and there may be multiple DRX configurations for the two or more DRX cycles of the joint DRX cycle. As shown by reference number 935, the UE 920 may wake up for an on-duration based at least in part on the DRX configuration and the rule. As shown by reference number 940, the network entity 910 may transmit a communication based at least in part on the rule. The network entity 910 may operate based at least in part on the same rule and information about the DRX configurations for DRX cycles of the joint DRX cycle. In this way, the UE 920 is synchronized with the network entity 910 while conserving power. As shown by reference number 945, the UE may sleep based at least in part on the DRX configuration. This is because the on-duration has ended. As shown by reference number 950, the UE 920 may skip waking up for an on-duration based at least in part on the rule. This may be in response to a condition or an event, such as a timing of a last (previous) on-duration of the joint DRX cycle, an amount of data, and/or the PDB. Other modifications make occur, such as an extension of an on-duration, a reduction of an on-duration, an addition of an on-duration, or a modification of a DRX parameter for the DRX configuration and corresponding DRX cycle.

The UE may continue with the DRX configuration of the DRX cycle or another DRX configuration of another DRX cycle of the joint DRX cycle. As shown by reference number 955, the UE 920 may wake up based at least in part on the rule. As shown by reference number 960, the network entity 910 may transmit a communication based at least in part on the rule. As shown by reference number 965, the UE 920 may sleep after the on-duration has ended.

In some aspects, as shown by reference number 970, the UE 920 may transmit a request for a rule or an explicit modification of the joint DRX cycle. The network entity 910 may honor the request, deny the request, or provide a different rule or modification than requested.

As indicated above, FIG. 9 is provided as an example. Other examples may differ from what is described with respect to FIG. 9.

Figure 10:
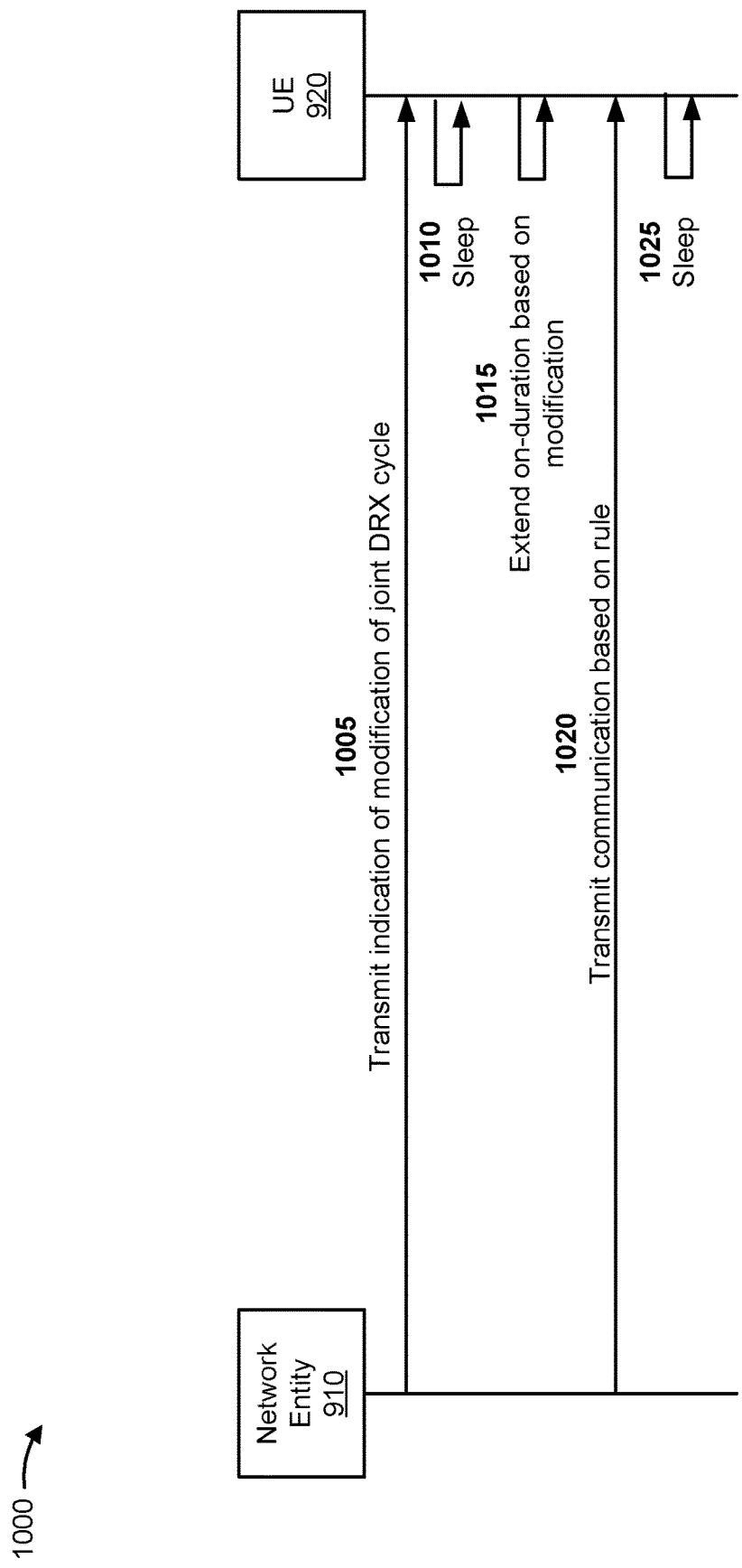
FIG. 10 is a diagram illustrating an example associated with transmitting an indication for joint DRX modification, in accordance with the present disclosure.

FIG. 10 is a diagram illustrating an example 1000 associated with transmitting an indication for joint DRX modification, in accordance with the present disclosure.

In some aspects, as shown by reference number 1005, the network entity 910 may transmit an indication of a modification of a joint DRX cycle. The indication may be in DCI or a MAC control element (MAC CE). The modification may be to skip, extend, or add an on-duration as described in connection with FIG. 8. The modification may also be to modify a DRX parameter. The modification may be to decrease a size of an on-duration. As shown by reference number 1010, the UE 920 may sleep.

As shown by reference number 1015, the UE 920 may, as an example of a modification, extend an on-duration based at least in part on the modification indicated by the network entity 910. As shown by reference number 1020, the network entity 910 may transmit a communication using the extended on-duration based at least in part on the modification. As shown by reference number 1025, the UE 920 may sleep.

As indicated above, FIG. 10 is provided as an example. Other examples may differ from what is described with regard to FIG. 10.

Figure 11:
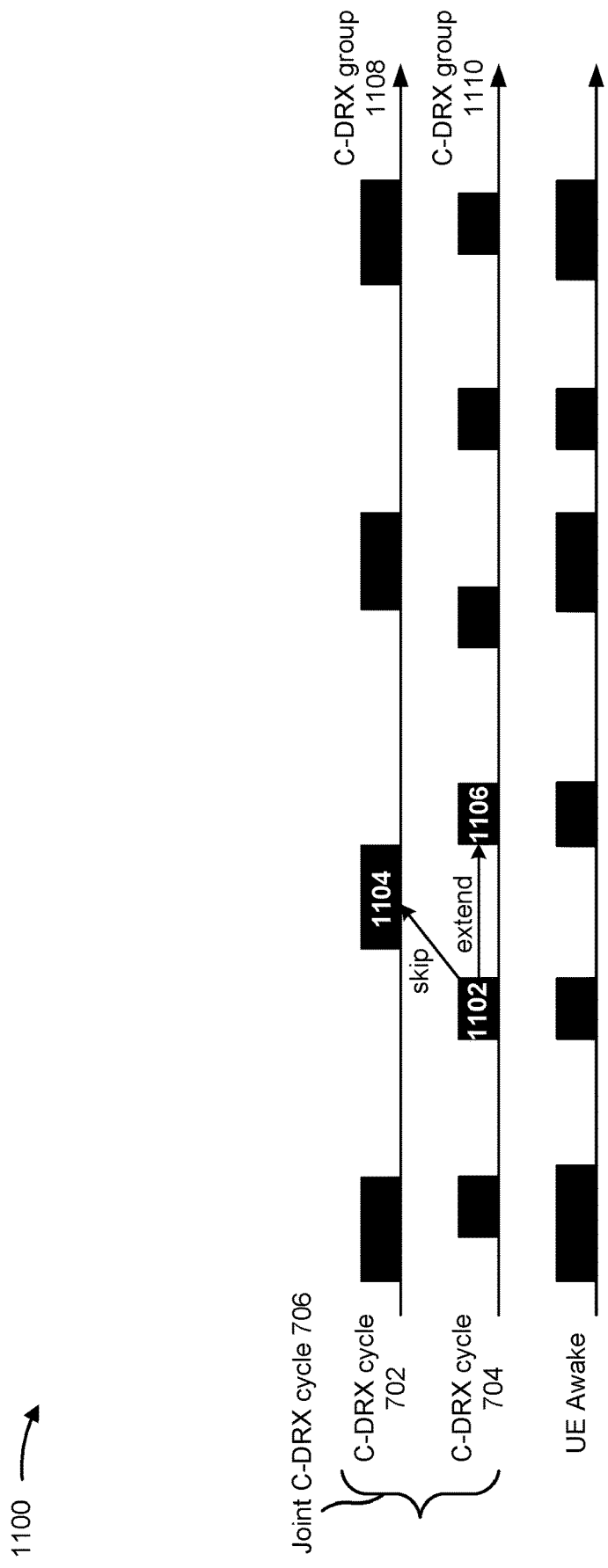
FIG. 11 is a diagram illustrating an example of modifying a joint DRX cycle, in accordance with the present disclosure.

FIG. 11 is a diagram illustrating an example 1100 of modifying a joint DRX cycle, in accordance with the present disclosure.

In some aspects, the network entity 910 may modify the joint DRX cycle with an indication that crosses DRX configurations or DRX cycles. For example, the network entity 910 may transmit the indication in on-duration 1102 using C-DRX cycle 704. The indication may apply to on-duration 1104 of C-DRX cycle 702 (e.g., skip) and to on-duration 1106 of C-DRX cycle 704 (e.g., extend). In some aspects, the network entity 910 may transmit the indication in DCI or a MAC CE.

In some aspects, C-DRX cycle 702 may be in DRX group 1108 and C-DRX cycle 704 may be in DRX group 1110. In this way, the UE may be configured for modification of the joint C-DRX cycle 706 across DRX cycles, DRX configurations, and/or DRX groups. In some aspects, C-DRX cycle 702 and C-DRX cycle 704 may both be in the same DRX group (e.g., DRX group 1108).

As indicated above, FIG. 11 is provided as an example. Other examples may differ from what is described with regard to FIG. 11.

Figure 12:
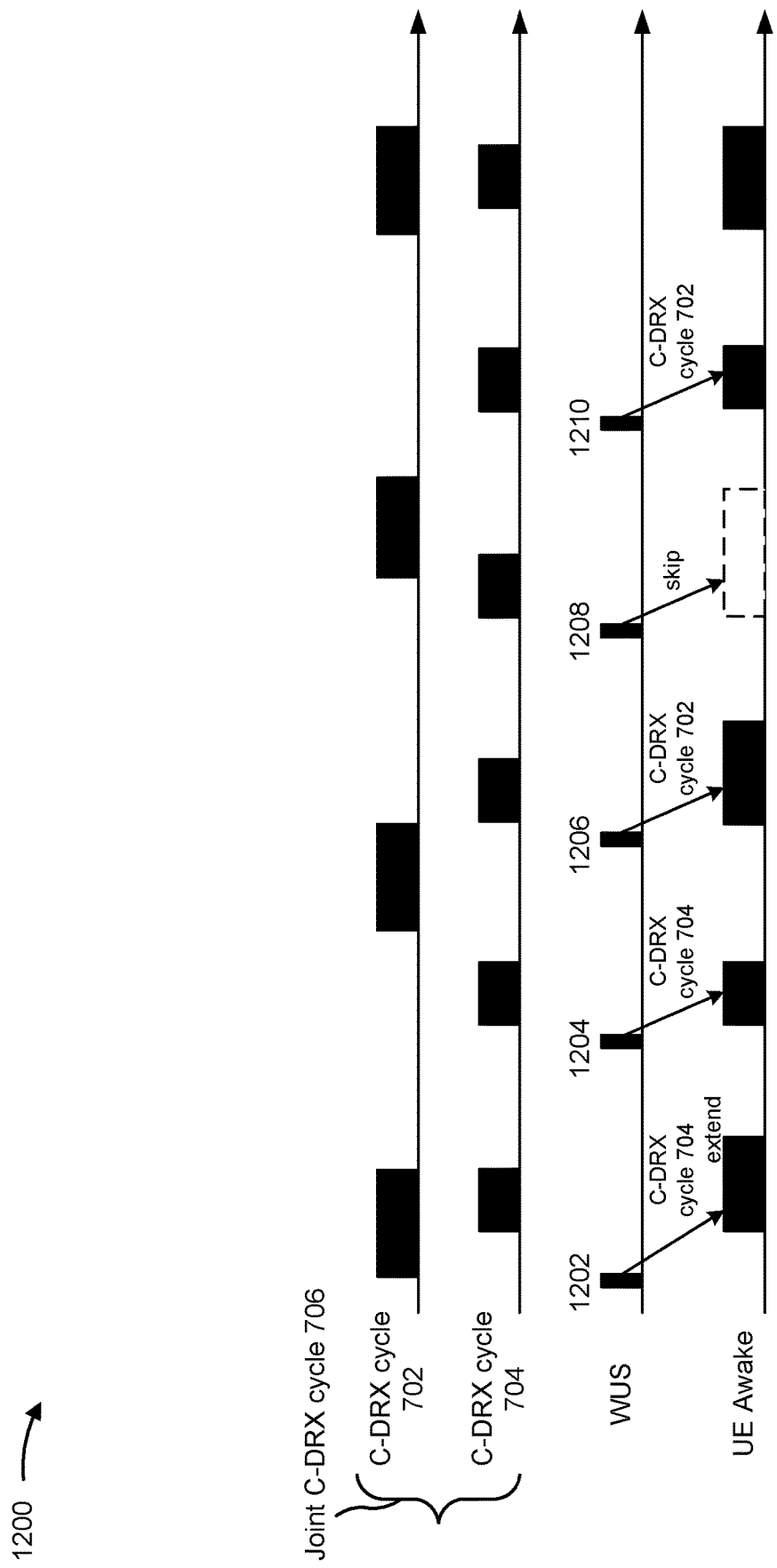
FIG. 12 is a diagram illustrating an example of modifying a joint DRX cycle, in accordance with the present disclosure.

FIG. 12 is a diagram illustrating an example 1200 of modifying a joint DRX cycle, in accordance with the present disclosure.

In some aspects, the network entity 910 may transmit the indication using a WUS. The WUS may be a common WUS that is defined for multiple DRX configurations. The WUS may include a DRX configuration identifier (ID) to identify which DRX configuration (and corresponding DRX cycle) is to be modified. If a DRX configuration is identified, on-durations of other DRX configurations may be skipped. The WUS may also identify specific on-durations with on-duration IDs. The WUS may also identify and modify specific DRX parameters for a DRX configuration ID or on-duration ID. A WUS may apply until a next WUS or for a specified quantity of on-durations (or DRX cycle periods), for a specified time duration, or until a specific condition or event occurs.

Example 1200 shows WUSs. For example, WUS 1202 indicates that C-DRX cycle 704 is to be used and the on-duration is to be extended. WUS 1204 indicate that C-DRX cycle 704 is to be used. WUS 1206 indicates that C-DRX cycle 702 is to be used. WUS 1208 indicates that the on-duration is to be skipped for either DRX cycle.

In some aspects, the DCI, MAC CE, or WUS may cause the UE 920 to switch DRX configurations. For example, WUS 1210 may indicate a switch from C-DRX cycle 704 to C-DRX cycle 702 for a specified time duration, a specified quantity of on-durations (or DRX cycle periods), or until another indication is provided. Accordingly, only C-DRX cycle 702 on-durations will be used. In some aspects, a specific WUS may be associated with a specific modification and/or a specific DRX cycle. The UE may use a modification or DRX cycle based at least in part on a mapping to a specific WUS.

As indicated above, FIG. 12 is provided as an example. Other examples may differ from what is described with regard to FIG. 12.

Figure 13:
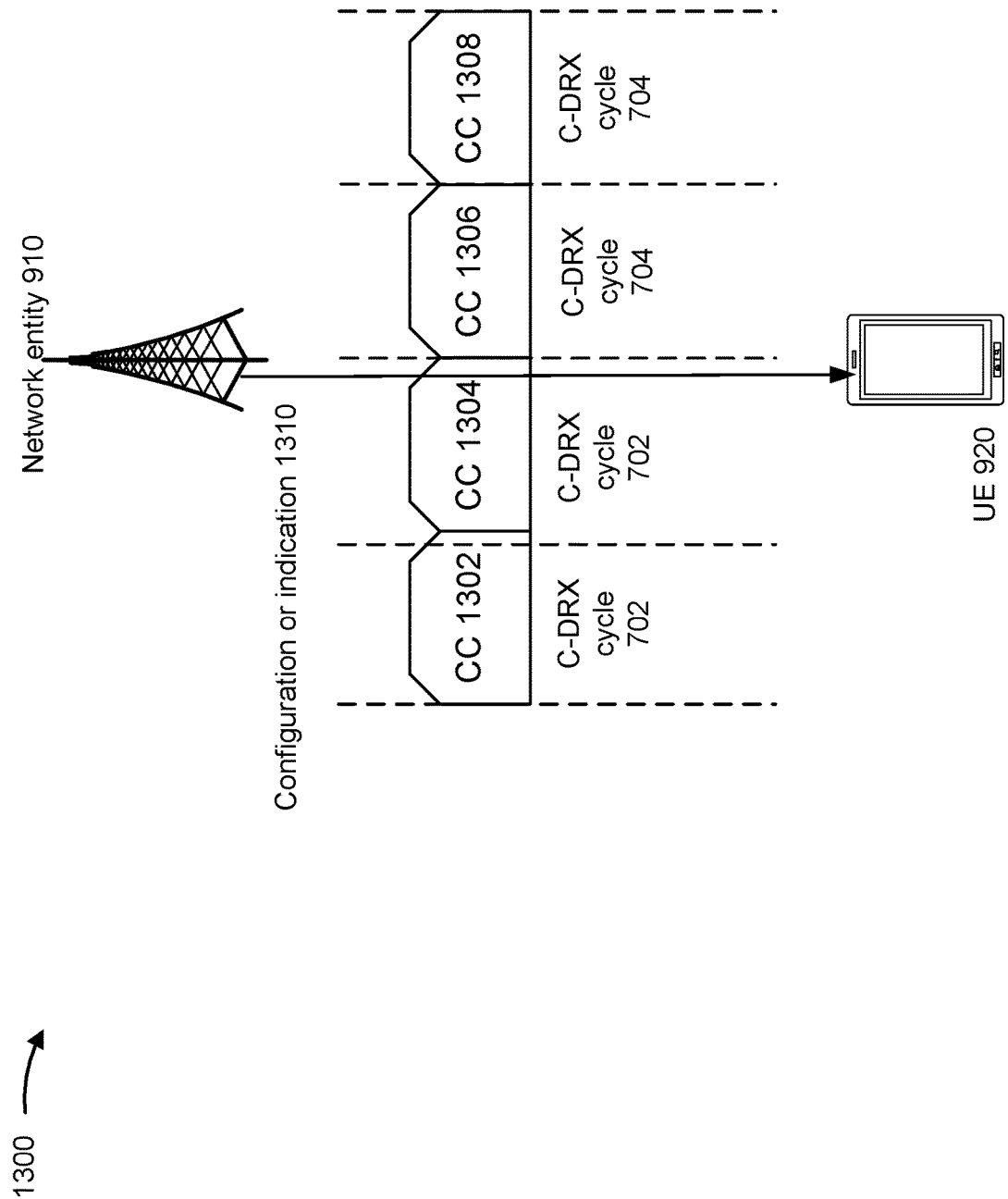
FIG. 13 is a diagram illustrating an example of modifying a joint DRX cycle across carriers, in accordance with the present disclosure.

FIG. 13 is a diagram illustrating an example 1300 of modifying a joint DRX cycle across carriers, in accordance with the present disclosure.

Carrier aggregation is a technology that enables two or more CCs (sometimes referred to as carriers) to be combined (e.g., into a single channel) for a single UE 120 to enhance data capacity. Carriers can be combined in the same or different frequency bands. Additionally, or alternatively, contiguous or non-contiguous carriers can be combined. In some scenarios, the UE, for example, may be configured to transmit and/or receive communications using multiple carriers.

Example 1300 shows multiple carriers, such as CC 1302, CC 1304, CC 1306, and CC 1308. The UE 920 may use C-DRX cycle 702 on CC 1302 and CC 1304 and C-DRX cycle 704 on CC 1306 and CC 1308. The UE 920 may operate using carrier aggregation.

In some aspects, the network entity 910 may perform cross-carrier modification of the C-DRX cycle 706. For example, the network entity 910 may transmit a configuration indicating a rule for modification or an indication of a modification. The configuration or indication 1310 may be transmitted using CC 1304 but may apply to C-DRX cycle 704 on CC 1306. In some aspects, the DRX cycles may on the same carrier and/or a configuration or indication may apply to DRX cycles on the same carrier. By modifying a joint DRX cycle, the UE may be able to conserve more power.

As indicated above, FIG. 13 is provided as an example. Other examples may differ from what is described with regard to FIG. 13.

Figure 14:
FIG. 14 is a diagram illustrating an example process performed, for example, by a UE, in accordance with the present disclosure.

FIG. 14 is a diagram illustrating an example process 1400 performed, for example, by a UE, in accordance with the present disclosure. Example process 1400 is an example where the UE (e.g., UE 120, UE 920) performs operations associated with modifying a joint DRX cycle.

As shown in FIG. 14, in some aspects, process 1400 may include receiving a configuration to indicate a rule to modify a joint DRX cycle of two or more DRX cycles (block 1410). For example, the UE (e.g., using communication manager 1808 and/or reception component 1802 depicted in FIG. 18) may receive a configuration to indicate a rule to modify a joint DRX cycle of two or more DRX cycles, as described above.

As further shown in FIG. 14, in some aspects, process 1400 may include waking up based at least in part on the rule (block 1420). For example, the UE (e.g., using communication manager 1808 and/or DRX component 1810 depicted in FIG. 18) may wake up based at least in part on the rule, as described above.

Process 1400 may include additional aspects, such as any single aspect or any combination of aspects described below and/or in connection with one or more other processes described elsewhere herein.

In a first aspect, the rule specifies to skip an on-duration of a first DRX cycle of the joint DRX cycle based at least in part on a condition or an event.

In a second aspect, alone or in combination with the first aspect, the condition or event is a time duration between an on-duration of the first DRX cycle and a next on-duration of a second DRX cycle of the joint DRX cycle satisfying a time threshold.

In a third aspect, alone or in combination with one or more of the first and second aspects, to skip the on-duration of the first DRX cycle includes to skip the on-duration of the first DRX cycle based at least in part on a PDB configured for the UE.

In a fourth aspect, alone or in combination with one or more of the first through third aspects, the rule specifies to extend an on-duration of a first DRX cycle of the joint DRX cycle based at least in part on a condition or an event.

In a fifth aspect, alone or in combination with one or more of the first through fourth aspects, the condition or event is a cancellation of an on-duration of a second DRX cycle of the joint DRX cycle, and a length of the on-duration of the second DRX cycle is greater than a length of a last on-duration of the first DRX cycle.

In a sixth aspect, alone or in combination with one or more of the first through fifth aspects, to extend the on-duration of the first DRX cycle includes to extend the on-duration of the first DRX cycle based at least in part on a PDB configured for the UE.

In a seventh aspect, alone or in combination with one or more of the first through sixth aspects, the rule specifies to add an on-duration to a first DRX cycle of the joint DRX cycle based at least in part on a condition or an event.

In an eighth aspect, alone or in combination with one or more of the first through seventh aspects, the condition or event is a time duration, between successive on-durations of the joint DRX cycle, satisfying a duration threshold and data to be transmitted satisfying a data threshold.

In a ninth aspect, alone or in combination with one or more of the first through eighth aspects, process 1400 includes applying the rule based at least in part on a condition or event.

In a tenth aspect, alone or in combination with one or more of the first through ninth aspects, process 1400 includes prioritizing on-durations of a DRX cycle, of the joint DRX cycle, satisfying a packet delay budget threshold.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
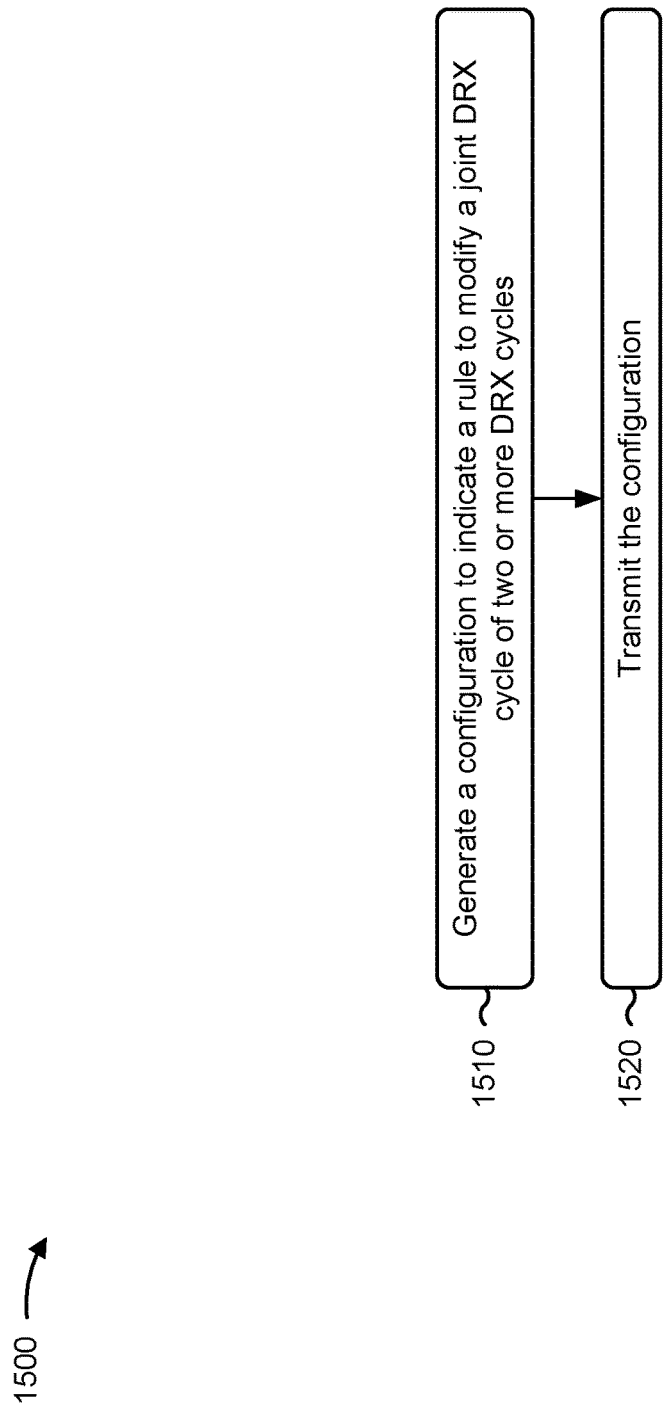
FIG. 15 is a diagram illustrating an example process performed, for example, by a network entity, in accordance with the present disclosure.

FIG. 15 is a diagram illustrating an example process 1500 performed, for example, by a network entity, in accordance with the present disclosure. Example process 1500 is an example where the network entity (e.g., base station 110, network entity 910) performs operations associated with modifying a joint DRX cycle.

As shown in FIG. 15, in some aspects, process 1500 may include generating a configuration to indicate a rule to modify a joint DRX cycle of two or more DRX cycles (block 1510). For example, the network entity (e.g., using communication manager 2108 and/or generation component 2110 depicted in FIG. 21) may generate a configuration to indicate a rule to modify a joint DRX cycle of two or more DRX cycles, as described above.

As further shown in FIG. 15, in some aspects, process 1500 may include transmitting the configuration (block 1520). For example, the network entity (e.g., using communication manager 2108 and/or transmission component 2104 depicted in FIG. 21) may transmit the configuration, as described above.

Process 1500 may include additional aspects, such as any single aspect or any combination of aspects described below and/or in connection with one or more other processes described elsewhere herein.

In a first aspect, the rule specifies to skip an on-duration of a first DRX cycle of the joint DRX cycle based at least in part on a condition or an event.

In a second aspect, alone or in combination with the first aspect, the rule specifies to extend an on-duration of a first DRX cycle of the joint DRX cycle based at least in part on a condition or an event.

In a third aspect, alone or in combination with one or more of the first and second aspects, the rule specifies to add an on-duration to a first DRX cycle of the joint DRX cycle based at least in part on a condition or an event.

In a fourth aspect, alone or in combination with one or more of the first through third aspects, the rule specifies to modify a DRX parameter of a first DRX cycle of the joint DRX cycle based at least in part on a condition or an event.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
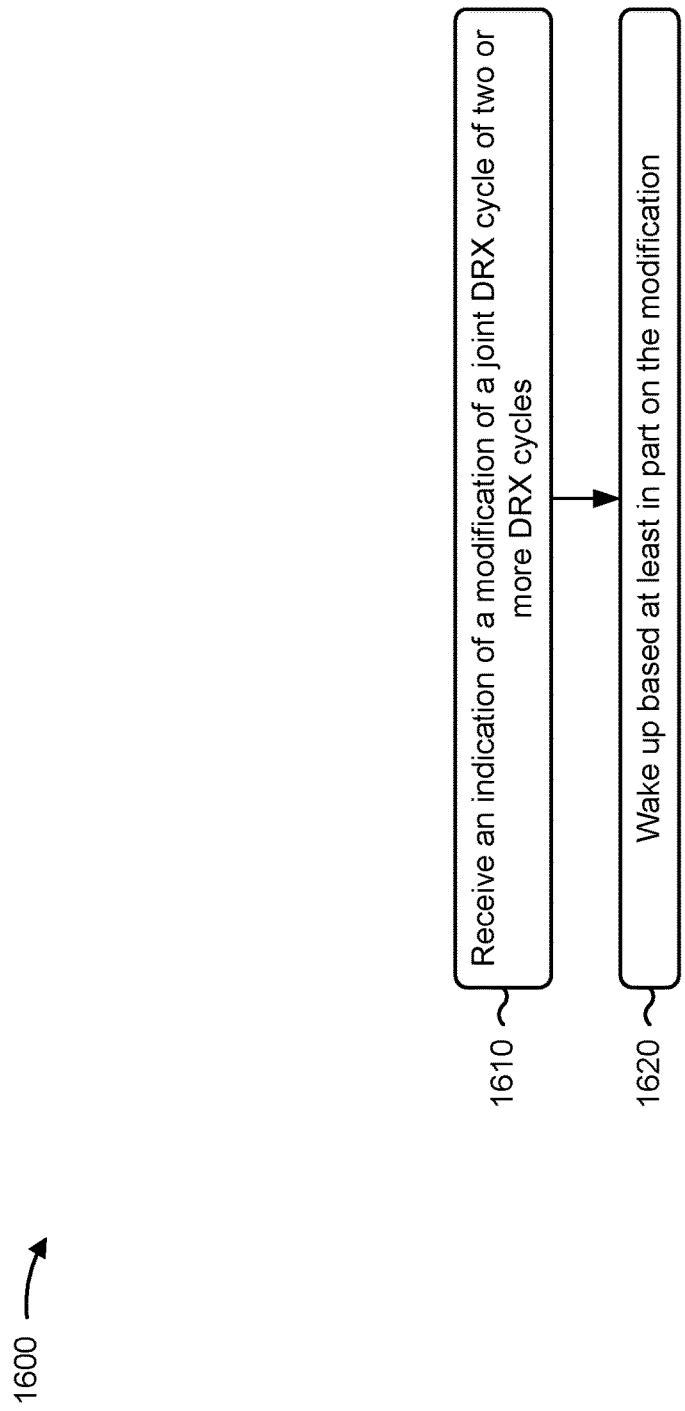
FIG. 16 is a diagram illustrating an example process performed, for example, by a UE, in accordance with the present disclosure.

FIG. 16 is a diagram illustrating an example process 1600 performed, for example, by a UE, in accordance with the present disclosure. Example process 1600 is an example where the UE (e.g., UE 120) performs operations associated with modifying a joint DRX cycle.

As shown in FIG. 16, in some aspects, process 1600 may include receiving an indication of a modification of a joint DRX cycle of two or more DRX cycles (block 1610). For example, the UE (e.g., using communication manager 1808 and/or reception component 1802 depicted in FIG. 18) may receive an indication of a modification of a joint DRX cycle of two or more DRX cycles, as described above.

As further shown in FIG. 16, in some aspects, process 1600 may include waking up based at least in part on the modification (block 1620). For example, the UE (e.g., using communication manager 1808 and/or DRX component 1810 depicted in FIG. 18) may wake up based at least in part on the modification, as described above.

Process 1600 may include additional aspects, such as any single aspect or any combination of aspects described below and/or in connection with one or more other processes described elsewhere herein.

In a first aspect, the modification includes skipping an on-duration of a first DRX cycle of the joint DRX cycle.

In a second aspect, alone or in combination with the first aspect, the modification includes extending an on-duration of a first DRX cycle of the joint DRX cycle.

In a third aspect, alone or in combination with one or more of the first and second aspects, the modification includes adding an on-duration to a first DRX cycle of the joint DRX cycle.

In a fourth aspect, alone or in combination with one or more of the first through third aspects, the modification includes modifying a DRX parameter for a first DRX cycle of the joint DRX cycle.

In a fifth aspect, alone or in combination with one or more of the first through fourth aspects, receiving the indication includes receiving the indication using a first DRX cycle of the joint DRX cycle, and process 1600 includes comprises applying the modification to a second DRX cycle of the joint DRX cycle.

In a sixth aspect, alone or in combination with one or more of the first through fifth aspects, the two or more DRX cycles of the joint DRX cycle belong to a same DRX group.

In a seventh aspect, alone or in combination with one or more of the first through sixth aspects, process 1600 includes transmitting a request for the indication.

In an eighth aspect, alone or in combination with one or more of the first through seventh aspects, the indication indicates a configuration or a parameter for one or more DRX cycles of the joint DRX cycle.

In a ninth aspect, alone or in combination with one or more of the first through eighth aspects, the indication applies for a specified time duration or until a next indication.

In a tenth aspect, alone or in combination with one or more of the first through ninth aspects, receiving the indication includes receiving the indication in a wake-up signal.

In an eleventh aspect, alone or in combination with one or more of the first through tenth aspects, the wake-up signal is mapped to a DRX configuration.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
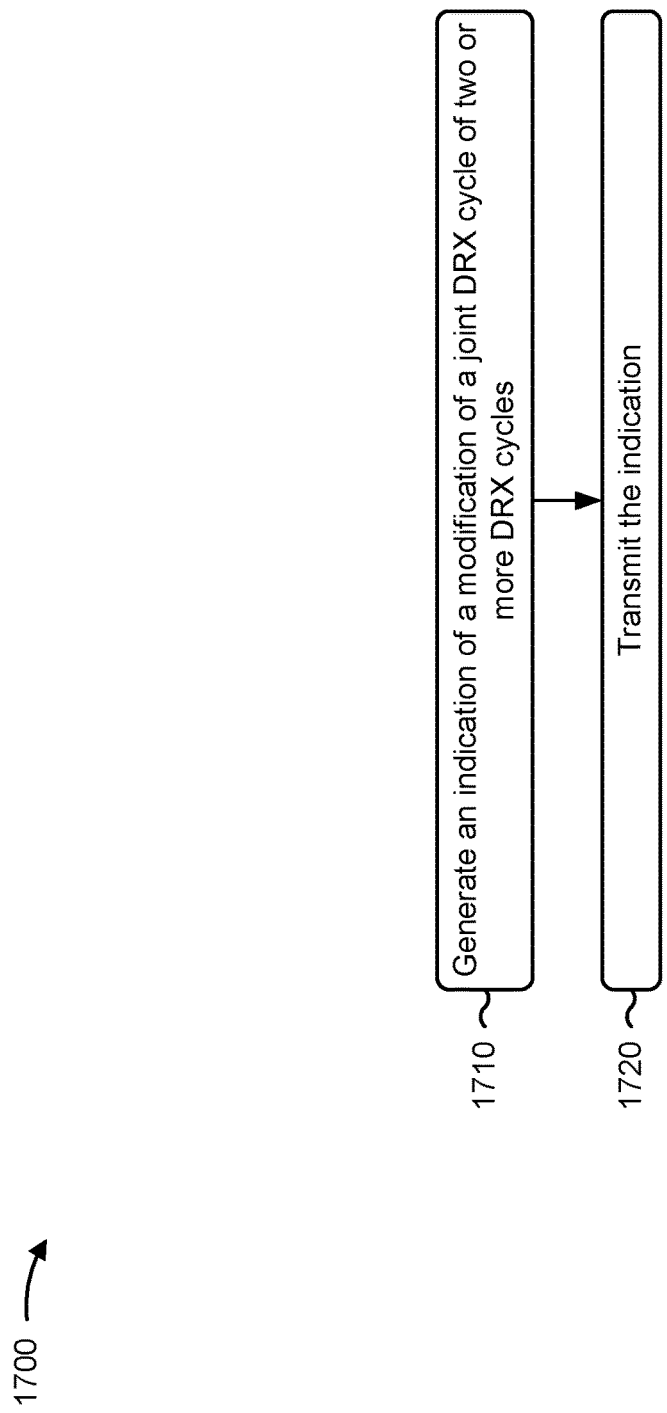
FIG. 17 is a diagram illustrating an example process performed, for example, by a network entity, in accordance with the present disclosure.

FIG. 17 is a diagram illustrating an example process 1700 performed, for example, by a network entity, in accordance with the present disclosure. Example process 1700 is an example where the network entity (e.g., base station 110, network entity 910) performs operations associated with modifying a joint DRX cycle.

As shown in FIG. 17, in some aspects, process 1700 may include generating an indication of a modification of a joint DRX cycle of two or more DRX cycles (block 1710). For example, the network entity (e.g., using communication manager 2108 and/or generation component 2110 depicted in FIG. 21) may generate an indication of a modification of a joint DRX cycle of two or more DRX cycles, as described above.

As further shown in FIG. 17, in some aspects, process 1700 may include transmitting the indication (block 1720). For example, the network entity (e.g., using communication manager 2108 and/or transmission component 2104 depicted in FIG. 21) may transmit the indication, as described above.

Process 1700 may include additional aspects, such as any single aspect or any combination of aspects described below and/or in connection with one or more other processes described elsewhere herein.

In a first aspect, the indication indicates a configuration or a parameter for one or more DRX cycles of the joint DRX cycle.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
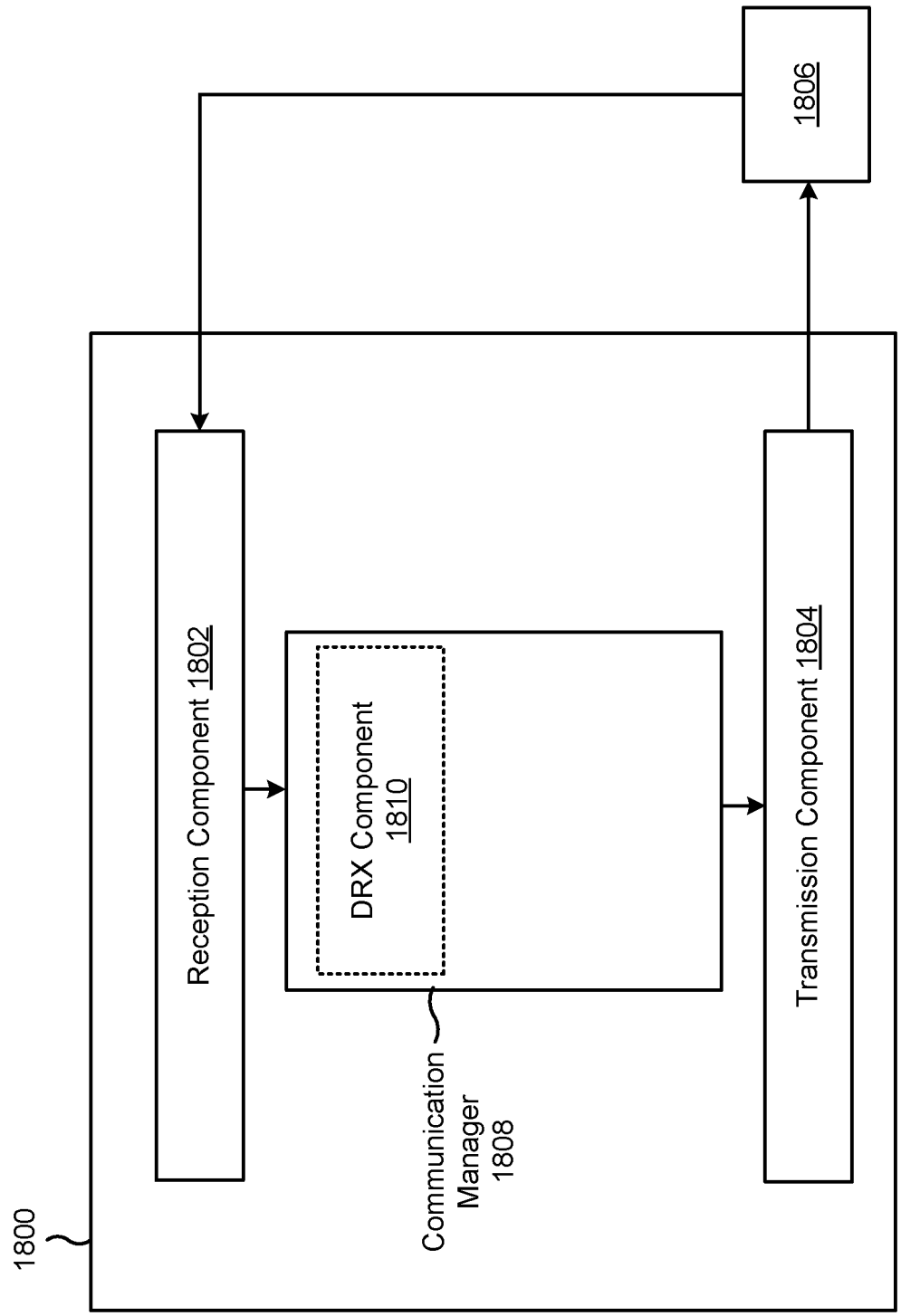
FIG. 18 is a diagram of an example apparatus for wireless communication, in accordance with the present disclosure.

FIG. 18 is a diagram of an example apparatus 1800 for wireless communication, in accordance with the present disclosure. The apparatus 1800 may be a UE, or a UE may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, or another wireless communication device) using the reception component 1802 and the transmission component 1804. As further shown, the apparatus 1800 may include the communication manager 1808. The communication manager 1808 may control and/or otherwise manage one or more operations of the reception component 1802 and/or the transmission component 1804. In some aspects, the communication manager 1808 may include one or more antennas, a modem, a controller/processor, a memory, or a combination thereof, of the UE described in connection with FIG. 2. The communication manager 1808 may be, or be similar to, the communication manager 140 depicted in FIGS. 1 and 2. For example, in some aspects, the communication manager 1808 may be configured to perform one or more of the functions described as being performed by the communication manager 140. In some aspects, the communication manager 1808 may include the reception component 1802 and/or the transmission component 1804. The communication manager 1808 may include a DRX component 1810, among other examples.

In some aspects, the apparatus 1800 may be configured to perform one or more operations described herein in connection with FIGS. 1-13. Additionally, or alternatively, the apparatus 1800 may be configured to perform one or more processes described herein, such as process 1400 of FIG. 14, process 1600 of FIG. 16, or a combination thereof. In some aspects, the apparatus 1800 and/or one or more components shown in FIG. 18 may include one or more components of the UE described in connection with FIG. 2. Additionally, or alternatively, one or more components shown in FIG. 18 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, a modem, a demodulator, a MIMO detector, a receive processor, a controller/processor, a memory, or a combination thereof, of the UE described in connection with FIG. 2.

The transmission component 1804 may transmit communications, such as reference signals, control information, data communications, or a combination thereof, to the apparatus 1806. In some aspects, one or more other components of the apparatus 1800 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modem, a modulator, a transmit MIMO processor, a transmit processor, a controller/processor, a memory, or a combination thereof, of the UE described in connection with FIG. 2. In some aspects, the transmission component 1804 may be co-located with the reception component 1802 in a transceiver.

In some aspects, the reception component 1802 may receive a configuration to indicate a rule to modify a joint DRX cycle of two or more DRX cycles. The DRX component 1810 may wake up based at least in part on the rule. The DRX component 1810 may apply the rule based at least in part on a condition or event.

The DRX component 1810 may prioritize on-durations of a DRX cycle, of the joint DRX cycle, satisfying a packet delay budget threshold.

In some aspects, the reception component 1802 may receive an indication of a modification of a joint DRX cycle of two or more DRX cycles. The DRX component 1810 may wake up based at least in part on the modification. The transmission component 1804 may transmit a request for the indication.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

Figure 19:
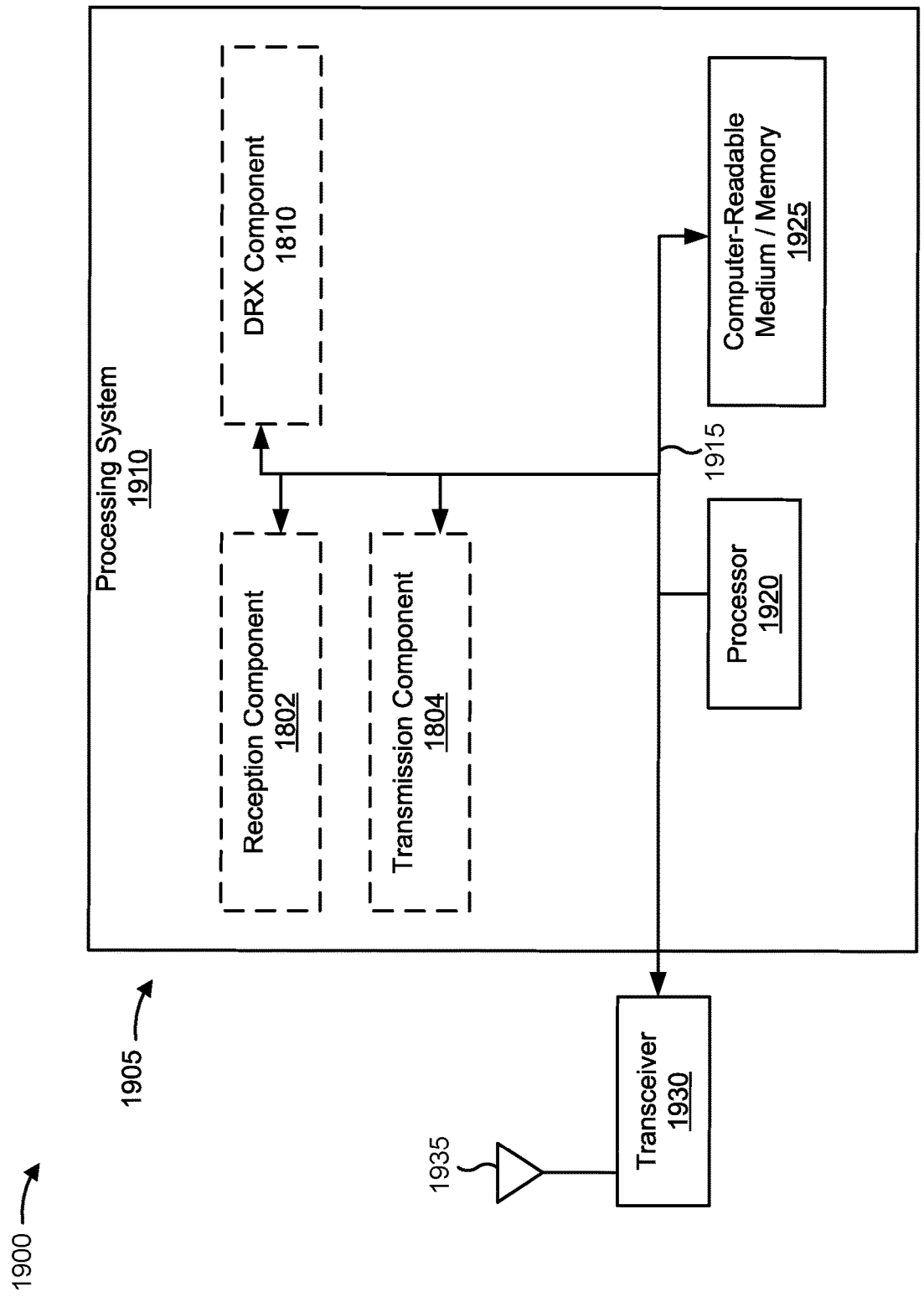
FIG. 19 is a diagram illustrating an example of a hardware implementation for an apparatus employing a processing system, in accordance with the present disclosure.

FIG. 19 is a diagram illustrating an example 1900 of a hardware implementation for an apparatus 1905 employing a processing system 1910, in accordance with the present disclosure. The apparatus 1905 may be a UE.

The processing system 1910 may be implemented with a bus architecture, represented generally by the bus 1915. The bus 1915 may include any number of interconnecting buses and bridges depending on the specific application of the processing system 1910 and the overall design constraints. The bus 1915 links together various circuits including one or more processors and/or hardware components, represented by the processor 1920, the illustrated components, and the computer-readable medium/memory 1925. The bus 1915 may also link various other circuits, such as timing sources, peripherals, voltage regulators, and/or power management circuits.

The processing system 1910 may be coupled to a transceiver 1930. The transceiver 1930 is coupled to one or more antennas 1935. The transceiver 1930 provides a means for communicating with various other apparatuses over a transmission medium. The transceiver 1930 receives a signal from the one or more antennas 1935, extracts information from the received signal, and provides the extracted information to the processing system 1910, specifically the reception component 1802. In addition, the transceiver 1930 receives information from the processing system 1910, specifically the transmission component 1804, and generates a signal to be applied to the one or more antennas 1935 based at least in part on the received information.

The processing system 1910 includes a processor 1920 coupled to a computer-readable medium/memory 1925. The processor 1920 is responsible for general processing, including the execution of software stored on the computer-readable medium/memory 1925. The software, when executed by the processor 1920, causes the processing system 1910 to perform the various functions described herein for any particular apparatus. The computer-readable medium/memory 1925 may also be used for storing data that is manipulated by the processor 1920 when executing software. The processing system further includes at least one of the illustrated components. The components may be software modules running in the processor 1920, resident/stored in the computer-readable medium/memory 1925, one or more hardware modules coupled to the processor 1920, or some combination thereof.

In some aspects, the processing system 1910 may be a component of the UE 120 and may include the memory 282 and/or at least one of the TX MIMO processor 266, the RX processor 258, and/or the controller/processor 280. In some aspects, the apparatus 1905 for wireless communication includes means for means for receiving a configuration to indicate a rule to modify a joint DRX cycle of two or more DRX cycles; and/or means for waking up based at least in part on the rule. In some aspects, the apparatus 1905 for wireless communication includes means for receiving an indication of a modification of a joint DRX cycle of two or more DRX cycles; and/or means for waking up based at least in part on the modification. The aforementioned means may be one or more of the aforementioned components of the apparatus 1800 and/or the processing system 1910 of the apparatus 1905 configured to perform the functions recited by the aforementioned means. As described elsewhere herein, the processing system 1910 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 19 is provided as an example. Other examples may differ from what is described in connection with FIG. 19.

Figure 20:
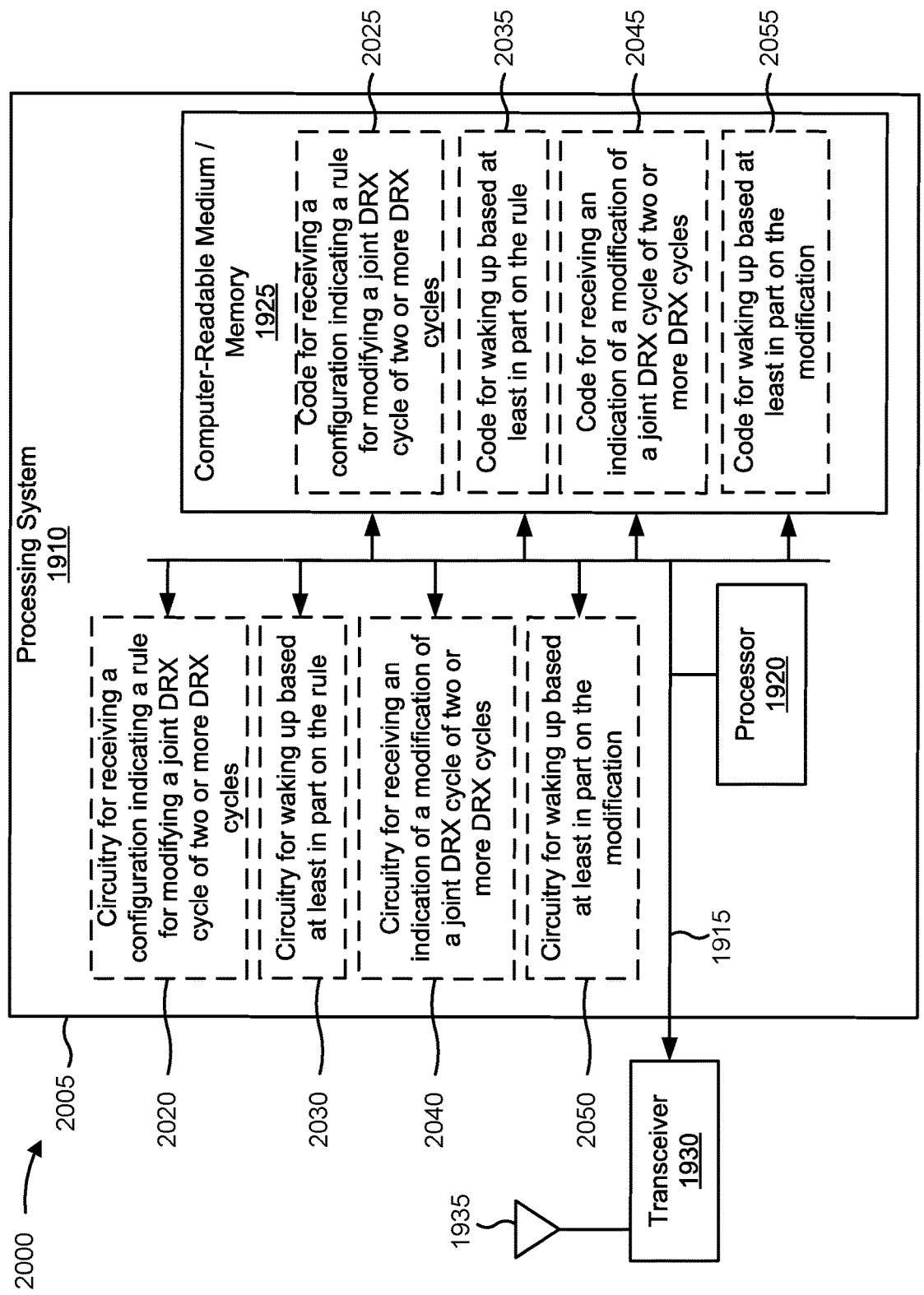
FIG. 20 is a diagram illustrating an example of an implementation of code and circuitry for an apparatus, in accordance with the present disclosure.

FIG. 20 is a diagram illustrating an example 2000 of an implementation of code and circuitry for an apparatus 2005, in accordance with the present disclosure. The apparatus 2005 may be a UE, or a UE may include the apparatus 2005.

As shown in FIG. 20, the apparatus 2005 may include circuitry for receiving a configuration to indicate a rule to modify a joint DRX cycle of two or more DRX cycles (circuitry 2020). For example, the circuitry 2020 may enable the apparatus 2005 to receive a configuration to indicate a rule to modify a joint DRX cycle of two or more DRX cycles.

As shown in FIG. 20, the apparatus 2005 may include, stored in computer-readable medium 1925, code for receiving a configuration to indicate a rule to modify a joint DRX cycle of two or more DRX cycles (code 2025). For example, the code 2025, when executed by processor 1920, may cause processor 1920 to cause transceiver 1930 to receive a configuration to indicate a rule to modify a joint DRX cycle of two or more DRX cycles.

As shown in FIG. 20, the apparatus 2005 may include circuitry for waking up based at least in part on the rule (circuitry 2030). For example, the circuitry 2030 may enable the apparatus 2005 to wake up based at least in part on the rule.

As shown in FIG. 20, the apparatus 2005 may include, stored in computer-readable medium 1925, code for waking up based at least in part on the rule (code 2035). For example, the code 2035, when executed by processor 1920, may cause processor 1920 to cause transceiver 1930 to wake up based at least in part on the rule.

As shown in FIG. 20, the apparatus 2005 may include circuitry for receiving an indication of a modification of a joint DRX cycle of two or more DRX cycles (circuitry 2040). For example, the circuitry 2040 may enable the apparatus 2005 to receive an indication of a modification of a joint DRX cycle of two or more DRX cycles.

As shown in FIG. 20, the apparatus 2005 may include, stored in computer-readable medium 1925, code for receiving an indication of a modification of a joint DRX cycle of two or more DRX cycles (code 2045). For example, the code 2045, when executed by processor 1920, may cause processor 1920 to cause transceiver 1930 to receive an indication of a modification of a joint DRX cycle of two or more DRX cycles.

As shown in FIG. 20, the apparatus 2005 may include circuitry for waking up based at least in part on the modification (circuitry 2050). For example, the circuitry 2050 may enable the apparatus 2005 to wake up based at least in part on the modification.

As shown in FIG. 20, the apparatus 2005 may include, stored in computer-readable medium 1925, code for waking up based at least in part on the modification (code 2055). For example, the code 2055, when executed by processor 1920, may cause processor 1920 to cause transceiver 1930 to wake up based at least in part on the modification.

FIG. 20 is provided as an example. Other examples may differ from what is described in connection with FIG. 20.

Figure 21:
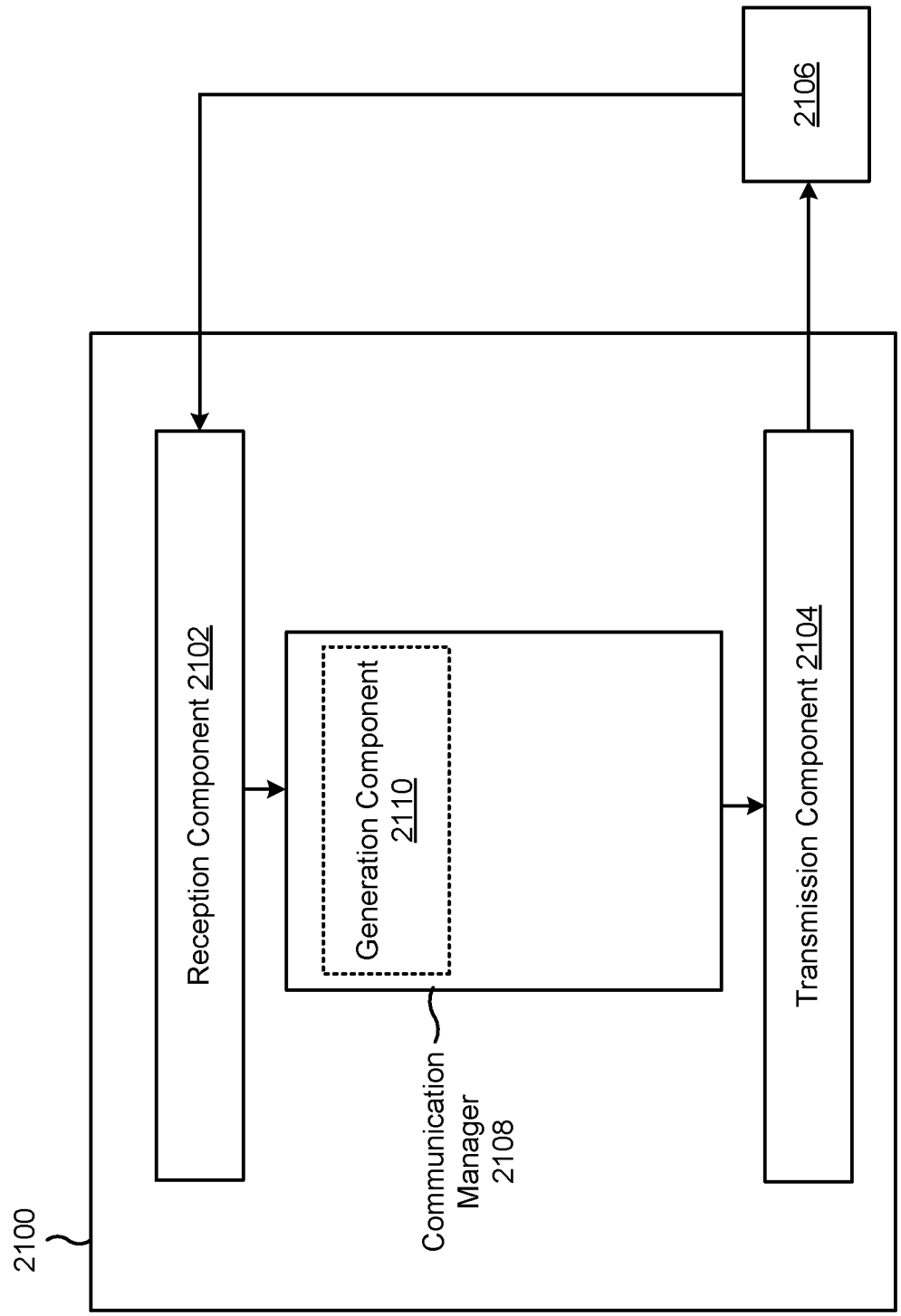
FIG. 21 is a diagram of an example apparatus for wireless communication, in accordance with the present disclosure.

FIG. 21 is a diagram of an example apparatus 2100 for wireless communication, in accordance with the present disclosure. The apparatus 2100 may be a network entity, or a network entity may include the apparatus 2100. In some aspects, the apparatus 2100 includes a reception component 2102 and a transmission component 2104, which may be in communication with one another (for example, via one or more buses and/or one or more other components). As shown, the apparatus 2100 may communicate with another apparatus 2106 (such as a UE, a base station, or another wireless communication device) using the reception component 2102 and the transmission component 2104. As further shown, the apparatus 2100 may include the communication manager 2108. The communication manager 2108 may control and/or otherwise manage one or more operations of the reception component 2102 and/or the transmission component 2104. In some aspects, the communication manager 2108 may include one or more antennas, a modem, a controller/processor, a memory, or a combination thereof, of the network entity described in connection with FIG. 2. The communication manager 2108 may be, or be similar to, the communication manager 150 depicted in FIGS. 1 and 2. For example, in some aspects, the communication manager 2108 may be configured to perform one or more of the functions described as being performed by the communication manager 150. In some aspects, the communication manager 2108 may include the reception component 2102 and/or the transmission component 2104. The communication manager 2108 may include a generation component 2110 among other examples.

In some aspects, the apparatus 2100 may be configured to perform one or more operations described herein in connection with FIGS. 1-13. Additionally, or alternatively, the apparatus 2100 may be configured to perform one or more processes described herein, such as process 1500 of FIG. 15, process 1700 of FIG. 17, or a combination thereof. In some aspects, the apparatus 2100 and/or one or more components shown in FIG. 21 may include one or more components of the network entity described in connection with FIG. 2. Additionally, or alternatively, one or more components shown in FIG. 21 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2102 may receive communications, such as reference signals, control information, data communications, or a combination thereof, from the apparatus 2106. The reception component 2102 may provide received communications to one or more other components of the apparatus 2100. In some aspects, the reception component 2102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2100. In some aspects, the reception component 2102 may include one or more antennas, a modem, a demodulator, a MIMO detector, a receive processor, a controller/processor, a memory, or a combination thereof, of the network entity described in connection with FIG. 2.

The transmission component 2104 may transmit communications, such as reference signals, control information, data communications, or a combination thereof, to the apparatus 2106. In some aspects, one or more other components of the apparatus 2100 may generate communications and may provide the generated communications to the transmission component 2104 for transmission to the apparatus 2106. In some aspects, the transmission component 2104 may perform signal processing on the generated communications (such as filtering, amplification, modulation, digital-to-analog conversion, multiplexing, interleaving, mapping, or encoding, among other examples), and may transmit the processed signals to the apparatus 2106. In some aspects, the transmission component 2104 may include one or more antennas, a modem, a modulator, a transmit MIMO processor, a transmit processor, a controller/processor, a memory, or a combination thereof, of the network entity described in connection with FIG. 2. In some aspects, the transmission component 2104 may be co-located with the reception component 2102 in a transceiver.

In some aspects, the generation component 2110 may generate a configuration to indicate a rule to modify a joint DRX cycle of two or more DRX cycles. The transmission component 2104 may transmit the configuration.

In some aspects, the generation component 2110 may generate an indication of a modification of a joint DRX cycle of two or more DRX cycles. The transmission component 2104 may transmit the indication.

The number and arrangement of components shown in FIG. 21 are provided as an example. In practice, there may be additional components, fewer components, different components, or differently arranged components than those shown in FIG. 21. Furthermore, two or more components shown in FIG. 21 may be implemented within a single component, or a single component shown in FIG. 21 may be implemented as multiple, distributed components. Additionally, or alternatively, a set of (one or more) components shown in FIG. 21 may perform one or more functions described as being performed by another set of components shown in FIG. 21.

Figure 22:
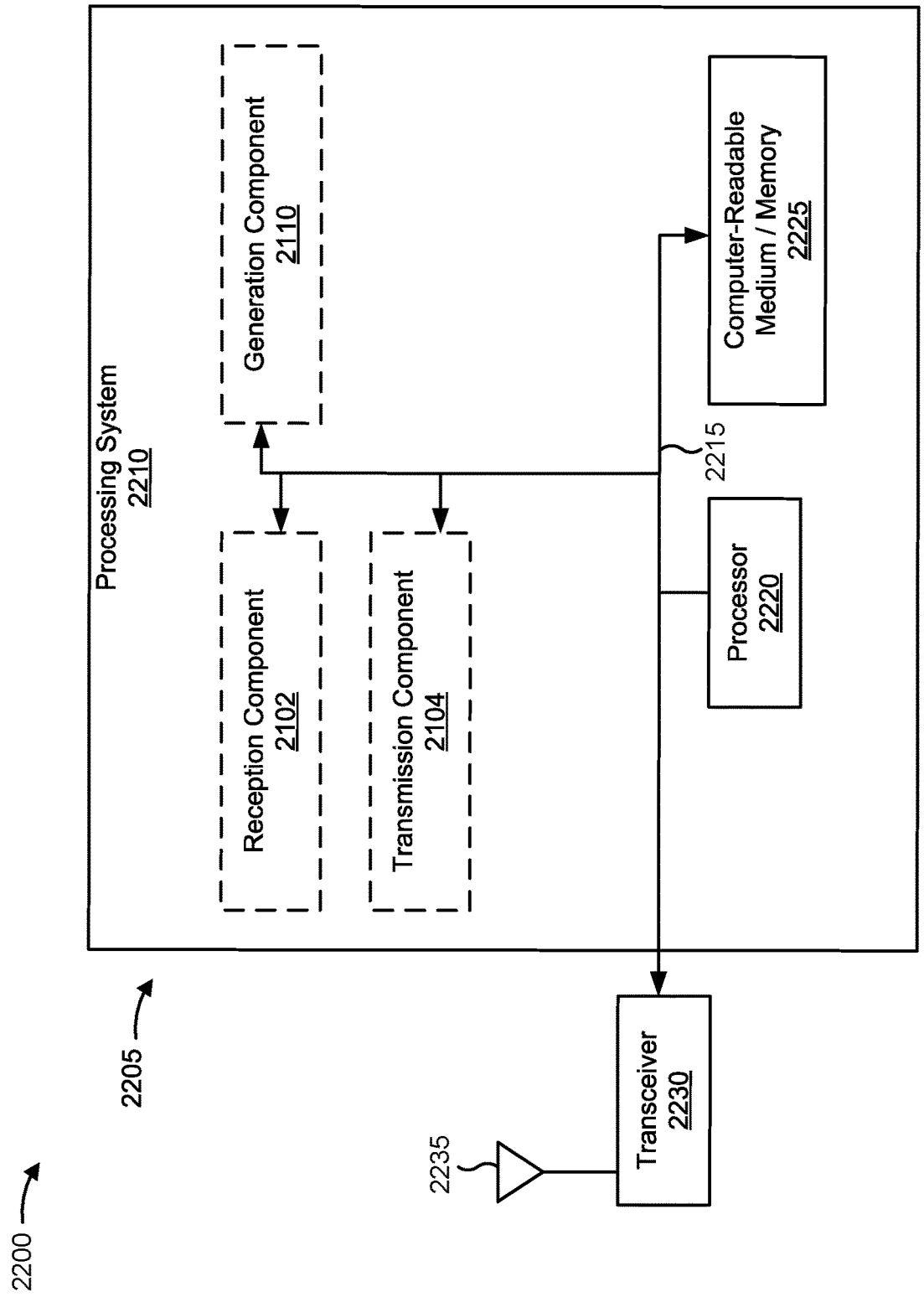
FIG. 22 is a diagram illustrating an example of a hardware implementation for an apparatus employing a processing system, in accordance with the present disclosure.

FIG. 22 is a diagram illustrating an example 2200 of a hardware implementation for an apparatus 2205 employing a processing system 2210, in accordance with the present disclosure. The apparatus 2205 may be a network entity.

The processing system 2210 may be implemented with a bus architecture, represented generally by the bus 2215. The bus 2215 may include any number of interconnecting buses and bridges depending on the specific application of the processing system 2210 and the overall design constraints. The bus 2215 links together various circuits including one or more processors and/or hardware components, represented by the processor 2220, the illustrated components, and the computer-readable medium/memory 2225. The bus 2215 may also link various other circuits, such as timing sources, peripherals, voltage regulators, and/or power management circuits.

The processing system 2210 may be coupled to a transceiver 2230. The transceiver 2230 is coupled to one or more antennas 2235. The transceiver 2230 provides a means for communicating with various other apparatuses over a transmission medium. The transceiver 2230 receives a signal from the one or more antennas 2235, extracts information from the received signal, and provides the extracted information to the processing system 2210, specifically the reception component 2102. In addition, the transceiver 2230 receives information from the processing system 2210, specifically the transmission component 2104, and generates a signal to be applied to the one or more antennas 2235 based at least in part on the received information.

The processing system 2210 includes a processor 2220 coupled to a computer-readable medium/memory 2225. The processor 2220 is responsible for general processing, including the execution of software stored on the computer-readable medium/memory 2225. The software, when executed by the processor 2220, causes the processing system 2210 to perform the various functions described herein for any particular apparatus. The computer-readable medium/memory 2225 may also be used for storing data that is manipulated by the processor 2220 when executing software. The processing system further includes at least one of the illustrated components. The components may be software modules running in the processor 2220, resident/stored in the computer-readable medium/memory 2225, one or more hardware modules coupled to the processor 2220, or some combination thereof.

In some aspects, the processing system 2210 may be a component of a network entity (e.g., base station 110) and may include the memory 242 and/or at least one of the TX MIMO processor 230, the RX processor 238, and/or the controller/processor 240. In some aspects, the apparatus 2205 for wireless communication includes means for generating a configuration to indicate a rule to modify a joint DRX cycle of two or more DRX cycles; and/or means for transmitting the configuration. In some aspects, the apparatus 2205 for wireless communication includes means for generating an indication of a modification of a joint DRX cycle of two or more DRX cycles; and/or means for transmitting the indication. The aforementioned means may be one or more of the aforementioned components of the apparatus 2100 and/or the processing system 2210 of the apparatus 2205 configured to perform the functions recited by the aforementioned means. As described elsewhere herein, the processing system 2210 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 22 is provided as an example. Other examples may differ from what is described in connection with FIG. 22.

Figure 23:
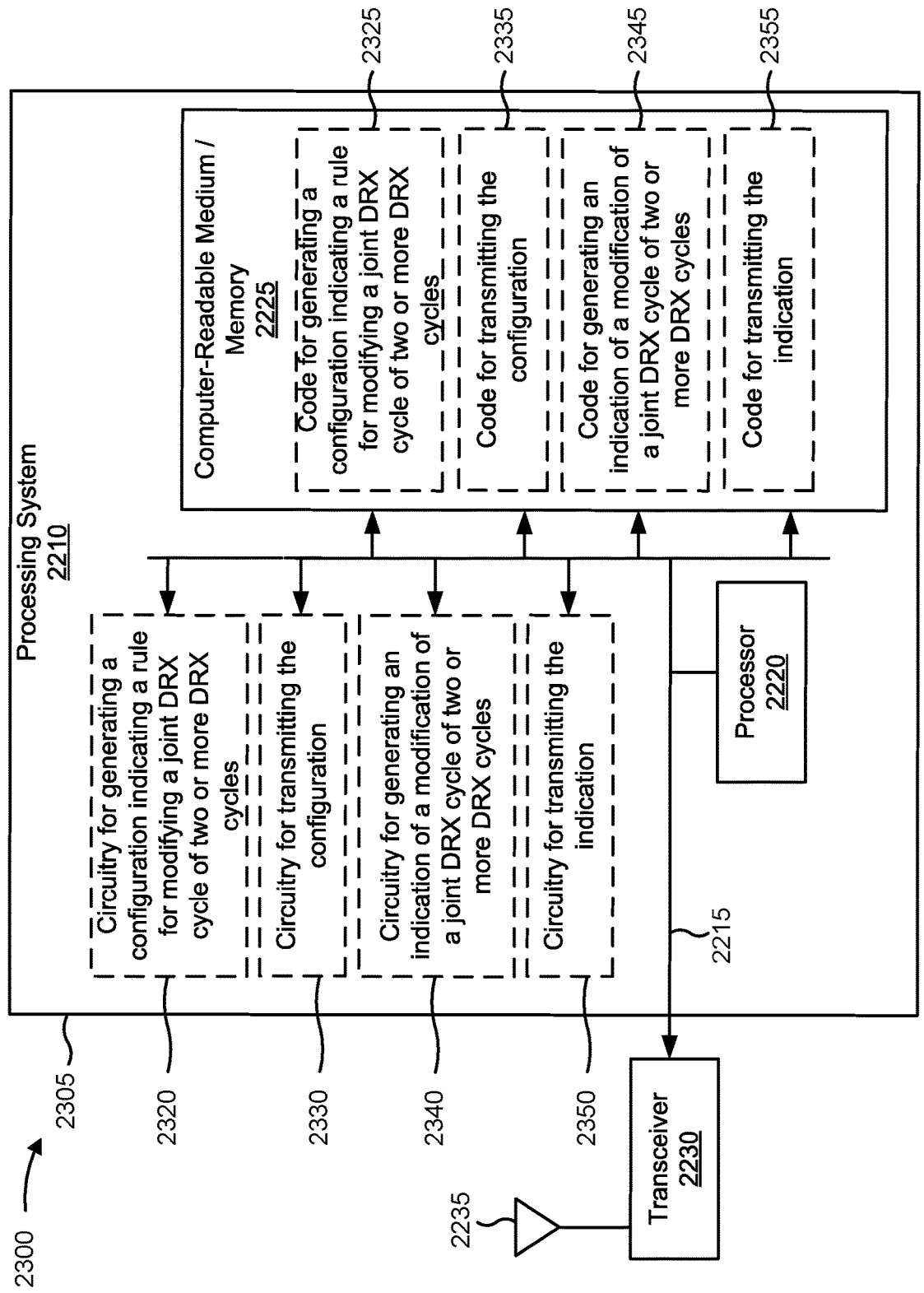
FIG. 23 is a diagram illustrating an example of an implementation of code and circuitry for an apparatus, in accordance with the present disclosure.

FIG. 23 is a diagram illustrating an example 2300 of an implementation of code and circuitry for an apparatus 2305, in accordance with the present disclosure. The apparatus 2305 may be a network entity, or a network entity may include the apparatus 2305.

As shown in FIG. 23, the apparatus 2305 may include circuitry for generating a configuration to indicate a rule to modify a joint DRX cycle of two or more DRX cycles (circuitry 2320). For example, the circuitry 2320 may enable the apparatus 2305 to generate a configuration to indicate a rule to modify a joint DRX cycle of two or more DRX cycles.

As shown in FIG. 23, the apparatus 2305 may include, stored in computer-readable medium 2225, code for generating a configuration to indicate a rule to modify a joint DRX cycle of two or more DRX cycles (code 2325). For example, the code 2325, when executed by processor 2220, may cause processor 2220 to generate a configuration to indicate a rule to modify a joint DRX cycle of two or more DRX cycles.

As shown in FIG. 23, the apparatus 2305 may include circuitry for transmitting the configuration (circuitry 2330). For example, the circuitry 2330 may enable the apparatus 2305 to transmit the configuration.

As shown in FIG. 23, the apparatus 2305 may include, stored in computer-readable medium 2225, code for transmitting the configuration (code 2335). For example, the code 2335, when executed by processor 2220, may cause processor 2220 to cause transceiver 2230 to transmit the configuration.

As shown in FIG. 23, the apparatus 2305 may include circuitry for generating an indication of a modification of a joint DRX cycle of two or more DRX cycles (circuitry 2340). For example, the circuitry 2340 may enable the apparatus 2305 to generate an indication of a modification of a joint DRX cycle of two or more DRX cycles.

As shown in FIG. 23, the apparatus 2305 may include, stored in computer-readable medium 2345, code for generating an indication of a modification of a joint DRX cycle of two or more DRX cycles (code 2345). For example, the code 2325, when executed by processor 2220, may cause processor 2220 to generate an indication of a modification of a joint DRX cycle of two or more DRX cycles.

As shown in FIG. 23, the apparatus 2305 may include circuitry for transmitting the indication (circuitry 2350). For example, the circuitry 2350 may enable the apparatus 2305 to transmit the indication.

As shown in FIG. 23, the apparatus 2305 may include, stored in computer-readable medium 2225, code for transmitting the indication (code 2355). For example, the code 2355, when executed by processor 2220, may cause processor 2220 to cause transceiver 2230 to transmit the indication.

FIG. 23 is provided as an example. Other examples may differ from what is described in connection with FIG. 23.

The following provides an overview of some Aspects of the present disclosure:

Aspect 1: A method of wireless communication performed by a user equipment (UE), comprising: receiving a configuration to indicate a rule to modify a joint discontinuous reception (DRX) cycle of two or more DRX cycles; and waking up based at least in part on the rule.

Aspect 2: The method of Aspect 1, wherein the rule specifies to skip an on-duration of a first DRX cycle of the joint DRX cycle based at least in part on a condition or an event.

Aspect 3: The method of Aspect 2, wherein the condition or event is a time duration between an on-duration of the first DRX cycle and a next on-duration of a second DRX cycle of the joint DRX cycle satisfying a time threshold.

Aspect 4: The method of Aspect 2 or 3, wherein to skip the on-duration of the first DRX cycle includes to skip the on-duration of the first DRX cycle based at least in part on a packet delay budget configured for the UE.

Aspect 5: The method of Aspect 1, wherein the rule specifies to extend an on-duration of a first DRX cycle of the joint DRX cycle based at least in part on a condition or an event.

Aspect 6: The method of Aspect 5, wherein the condition or event is a cancellation of an on-duration of a second DRX cycle of the joint DRX cycle, and wherein a length of the on-duration of the second DRX cycle is greater than a length of a last on-duration of the first DRX cycle.

Aspect 7: The method of Aspect 5 or 6, wherein to extend the on-duration of the first DRX cycle includes to extend the on-duration of the first DRX cycle based at least in part on a packet delay budget configured for the UE.

Aspect 8: The method of Aspect 1, wherein the rule specifies to add an on-duration to a first DRX cycle of the joint DRX cycle based at least in part on a condition or an event.

Aspect 9: The method of Aspect 8, wherein the condition or event is a time duration, between successive on-durations of the joint DRX cycle, satisfying a duration threshold and data to be transmitted satisfying a data threshold.

Aspect 10: The method of any of Aspects 1-9, further comprising applying the rule based at least in part on a condition or event.

Aspect 11: The method of any of Aspects 1-10, further comprising prioritizing on-durations of a DRX cycle, of the joint DRX cycle, satisfying a packet delay budget threshold.

Aspect 12: A method of wireless communication performed by a network entity, comprising: generating a configuration to indicate a rule to modify a joint discontinuous reception (DRX) cycle of two or more DRX cycles; and transmitting the configuration.

Aspect 13: The method of Aspect 12, wherein the rule specifies to skip an on-duration of a first DRX cycle of the joint DRX cycle based at least in part on a condition or an event.

Aspect 14: The method of Aspect 12, wherein the rule specifies to extend an on-duration of a first DRX cycle of the joint DRX cycle based at least in part on a condition or an event.

Aspect 15: The method of Aspect 12, wherein the rule specifies to add an on-duration to a first DRX cycle of the joint DRX cycle based at least in part on a condition or an event.

Aspect 16: The method of Aspect 12, wherein the rule specifies to modify a DRX parameter of a first DRX cycle of the joint DRX cycle based at least in part on a condition or an event.

Aspect 17: A method of wireless communication performed by a user equipment (UE), comprising: receiving an indication of a modification of a joint discontinuous reception (DRX) cycle of two or more DRX cycles; and waking up based at least in part on the modification.

Aspect 18: The method of Aspect 17, wherein the modification includes skipping an on-duration of a first DRX cycle of the joint DRX cycle.

Aspect 19: The method of Aspect 17, wherein the modification includes extending an on-duration of a first DRX cycle of the joint DRX cycle.

Aspect 20: The method of Aspect 17, wherein the modification includes adding an on-duration to a first DRX cycle of the joint DRX cycle.

Aspect 21: The method of Aspect 17, wherein the modification includes modifying a DRX parameter for a first DRX cycle of the joint DRX cycle.

Aspect 22: The method of any of Aspects 17-21, wherein receiving the indication includes receiving the indication using a first DRX cycle of the joint DRX cycle, and wherein the method further comprises applying the modification to a second DRX cycle of the joint DRX cycle.

Aspect 23: The method of any of Aspects 17-21, wherein the two or more DRX cycles of the joint DRX cycle belong to a same DRX group.

Aspect 24: The method of any of Aspects 17-23, further comprising transmitting a request for the indication.

Aspect 25: The method of any of Aspects 17-24, wherein the indication indicates a configuration or a parameter for one or more DRX cycles of the joint DRX cycle.

Aspect 26: The method of any of Aspects 17-25, wherein the indication applies for a specified time duration or until a next indication.

Aspect 27: The method of any of Aspects 17-26, wherein receiving the indication includes receiving the indication in a wake-up signal.

Aspect 28: The method of any of Aspects 17-27, wherein the wake-up signal is mapped to a DRX configuration.

Aspect 29: A method of wireless communication performed by a network entity, comprising: generating an indication of a modification of a joint discontinuous reception (DRX) cycle of two or more DRX cycles; and transmitting the indication.

Aspect 30: The method of Aspect 29, wherein the indication indicates a configuration or a parameter for one or more DRX cycles of the joint DRX cycle.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors coupled to the one or more memories, the one or more processors configured to cause the UE to:
receive a configuration to indicate a rule to modify a joint discontinuous reception (DRX) cycle of two or more DRX cycles; and
wake up based at least in part on the rule.

2. The UE of claim 1, wherein the UE further comprises a transceiver, wherein the one or more processors are configured to cause the UE to receive, via the transceiver, the configuration, and wherein the rule specifies to skip an on-duration of a first DRX cycle of the joint DRX cycle based at least in part on a condition or an event.

3. The UE of claim 2, wherein the condition or event is a satisfaction of a time threshold of a time duration between the on-duration of the first DRX cycle and a next on-duration of a second DRX cycle of the joint DRX cycle.

4. The UE of claim 2, wherein the one or more processors, to skip the on-duration of the first DRX cycle, are configured to cause the UE to skip the on-duration of the first DRX cycle based at least in part on a packet delay budget configured for the UE.

5. The UE of claim 1, wherein the rule specifies to extend an on-duration of a first DRX cycle of the joint DRX cycle based at least in part on a condition or an event.

6. The UE of claim 5, wherein the condition or event is a cancellation of an on-duration of a second DRX cycle of the joint DRX cycle, and wherein a length of the on-duration of the second DRX cycle is greater than a length of a last on-duration of the first DRX cycle.

7. The UE of claim 5, wherein the one or more processors, to extend the on-duration of the first DRX cycle, are configured to cause the UE to extend the on-duration of the first DRX cycle based at least in part on a packet delay budget configured for the UE.

8. The UE of claim 1, wherein the rule specifies to add an on-duration to a first DRX cycle of the joint DRX cycle based at least in part on a condition or an event.

9. The UE of claim 8, wherein the condition or event is a satisfaction of a time threshold of a time duration, between successive on-durations of the joint DRX cycle, satisfying a duration threshold and data to be transmitted.

10. The UE of claim 1, wherein the one or more processors are configured to cause the UE to apply the rule based at least in part on a condition or event.

11. The UE of claim 1, wherein the one or more processors are configured to cause the UE to prioritize a satisfaction of a packet delay budget threshold of on-durations of a DRX cycle, of the joint DRX cycle.

12. A network entity for wireless communication, comprising:
one or more memories; and
one or more processors, coupled to the one or more memories, the one or more processors configured to cause the network entity to:
generate a configuration to indicate a rule to modify a joint discontinuous reception (DRX) cycle of two or more DRX cycles; and
transmit the configuration.

13. The network entity of claim 12, wherein the network entity further comprises a transceiver, wherein the one or more processors are configured to cause the network entity to transmit, via the transceiver, the configuration, and wherein the rule specifies to skip an on-duration of a first DRX cycle of the joint DRX cycle based at least in part on a condition or an event.

14. The network entity of claim 12, wherein the rule specifies to extend an on-duration of a first DRX cycle of the joint DRX cycle based at least in part on a condition or an event.

15. The network entity of claim 12, wherein the rule specifies to add an on-duration to a first DRX cycle of the joint DRX cycle based at least in part on a condition or an event.

16. The network entity of claim 12, wherein the rule specifies to modify a DRX parameter of a first DRX cycle of the joint DRX cycle based at least in part on a condition or an event.

17. A user equipment (UE) for wireless communication, comprising:
one or more memories; and
one or more processors, coupled to the one or more memories, the one or more processors configured to cause the UE to:
receive an indication of a modification of a joint discontinuous reception (DRX) cycle of two or more DRX cycles; and
wake up based at least in part on the modification.

18. The UE of claim 17, wherein the UE further comprises a transceiver, wherein the one or more processors are configured to cause the UE to receive, via the transceiver, the indication, and wherein the modification includes a skip of an on-duration of a first DRX cycle of the joint DRX cycle.

19. The UE of claim 17, wherein the modification includes an extension of an on-duration of a first DRX cycle of the joint DRX cycle.

20. The UE of claim 17, wherein the modification includes an addition of an on-duration to a first DRX cycle of the joint DRX cycle.

21. The UE of claim 17, wherein the modification is of a DRX parameter for a first DRX cycle of the joint DRX cycle.

22. The UE of claim 17, wherein the UE further comprises a transceiver, wherein the one or more processors are configured to cause the UE to receive, by the transceiver, the indication based at least in part on a first DRX cycle of the joint DRX cycle, and wherein the one or more processors are configured to cause the UE to apply the modification to a second DRX cycle of the joint DRX cycle.

23. The UE of claim 17, wherein the two or more DRX cycles of the joint DRX cycle belong to a same DRX group.

24. The UE of claim 17, wherein the one or more processors are configured to cause the UE to transmit a request for the indication.

25. The UE of claim 17, wherein the indication indicates a configuration or a parameter for one or more DRX cycles of the joint DRX cycle.

26. The UE of claim 17, wherein the indication applies for a specified time duration or until a next indication.

27. The UE of claim 17, wherein the one or more processors, to receive the indication, are configured to cause the UE to receive the indication in a wake-up signal.

28. The UE of claim 27, wherein the wake-up signal is mapped to a DRX configuration.

29. A network entity for wireless communication, comprising:
one or more memories; and
one or more processors, coupled to the one or more memories, the one or more processors configured to cause the network entity to:
generate an indication of a modification of a joint discontinuous reception (DRX) cycle of two or more DRX cycles; and
transmit the indication.

30. The network entity of claim 29, further comprising a transceiver configured to cause the network entity to transmit the indication, and wherein the indication indicates a configuration or a parameter for one or more DRX cycles of the joint DRX cycle.

31. A method for wireless communication at a user equipment (UE), comprising:
receiving a configuration to indicate a rule to modify a joint discontinuous reception (DRX) cycle of two or more DRX cycles; and
waking up based at least in part on the rule.

32. The method of claim 31, wherein the rule specifies to extend an on-duration of a first DRX cycle of the joint DRX cycle based at least in part on a condition or an event.

33. The method of claim 32, wherein the condition or event is a cancellation of an on-duration of a second DRX cycle of the joint DRX cycle, and wherein a length of the on-duration of the second DRX cycle is greater than a length of a last on-duration of the first DRX cycle.

34. A method for wireless communication at a network entity, comprising:
generating a configuration to indicate a rule to modify a joint discontinuous reception (DRX) cycle of two or more DRX cycles; and
transmitting the configuration.

35. The method of claim 34, wherein the rule specifies to skip an on-duration of a first DRX cycle of the joint DRX cycle based at least in part on a condition or an event.

36. The method of claim 34, wherein the rule specifies to extend an on-duration of a first DRX cycle of the joint DRX cycle based at least in part on a condition or an event.

37. A method for wireless communication at a user equipment (UE), comprising:
receiving an indication of a modification of a joint discontinuous reception (DRX) cycle of two or more DRX cycles; and
waking up based at least in part on the modification.

38. The method of claim 37, wherein the modification includes skipping an on-duration of a first DRX cycle of the joint DRX cycle.

39. The method of claim 37, wherein the modification includes extending an on-duration of a first DRX cycle of the joint DRX cycle.

40. A method for wireless communication at a network entity, comprising:
generating an indication of a modification of a joint discontinuous reception (DRX) cycle of two or more DRX cycles; and
transmitting the indication.

41. The method of claim 40, wherein the indication indicates a configuration or a parameter for one or more DRX cycles of the joint DRX cycle.

42. A non-transitory computer-readable medium storing a set of instructions for wireless communication, the set of instructions comprising:
one or more instructions that, when executed by one or more processors of a user equipment (UE), cause the UE to:
receive a configuration to indicate a rule to modify a joint discontinuous reception (DRX) cycle of two or more DRX cycles; and
wake up based at least in part on the rule.

43. A non-transitory computer-readable medium storing a set of instructions for wireless communication, the set of instructions comprising:
one or more instructions that, when executed by one or more processors of a network entity, cause the network entity to:
generate a configuration to indicate a rule to modify a joint discontinuous reception (DRX) cycle of two or more DRX cycles; and
transmit the configuration.

44. A non-transitory computer-readable medium storing a set of instructions for wireless communication, the set of instructions comprising:
one or more instructions that, when executed by one or more processors of a user equipment (UE), cause the UE to:
receive an indication of a modification of a joint discontinuous reception (DRX) cycle of two or more DRX cycles; and
wake up based at least in part on the modification.

45. A non-transitory computer-readable medium storing a set of instructions for wireless communication, the set of instructions comprising:
one or more instructions that, when executed by one or more processors of a network entity to, cause the network entity to:
generate an indication of a modification of a joint discontinuous reception (DRX) cycle of two or more DRX cycles; and
transmit the indication.

\* \* \* \* \*